United States Patent
Kanada

(10) Patent No.: US 7,899,171 B2
(45) Date of Patent: Mar. 1, 2011

(54) VOICE CALL SYSTEM AND METHOD OF PROVIDING CONTENTS DURING A VOICE CALL

(75) Inventor: Yasusi Kanada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1252 days.

(21) Appl. No.: 11/492,831

(22) Filed: Jul. 26, 2006

(65) Prior Publication Data

US 2007/0071204 A1     Mar. 29, 2007

(30) Foreign Application Priority Data

Sep. 13, 2005     (JP) ............................. 2005-265283

(51) Int. Cl.
*H04M 3/42*     (2006.01)
(52) U.S. Cl. ............................. 379/207.01; 342/357.29; 379/158; 379/201.01; 455/432.3; 455/456.3
(58) Field of Classification Search ................ 379/67.1, 379/88.25, 158, 201.01, 207.01; 455/412.2, 455/432.3, 456.3; 713/323; 342/357.29
See application file for complete search history.

(56) References Cited

U.S. PATENT DOCUMENTS

| | | | | |
|---|---|---|---|---|
| 5,742,905 | A * | 4/1998 | Pepe et al. ................... | 455/461 |
| 6,134,314 | A * | 10/2000 | Dougherty et al. ...... | 379/201.01 |
| 6,320,534 | B1 * | 11/2001 | Goss ...................... | 342/357.29 |
| 7,283,805 | B2 * | 10/2007 | Agrawal ................... | 455/412.2 |
| 7,532,884 | B2 * | 5/2009 | Silver et al. .............. | 455/432.3 |
| 2002/0111172 | A1 * | 8/2002 | DeWolf et al. .............. | 455/456 |
| 2004/0240652 | A1 | 12/2004 | Kanada | |
| 2005/0198545 | A1 * | 9/2005 | Wieck et al. ................. | 713/323 |
| 2005/0265535 | A1 | 12/2005 | Kanada | |
| 2006/0008117 | A1 | 1/2006 | Kanada | |
| 2006/0067500 | A1 | 3/2006 | Christofferson et al. | |
| 2007/0071204 | A1 * | 3/2007 | Kanada ....................... | 379/158 |
| 2009/0136010 | A1 * | 5/2009 | Strietzel ................... | 379/88.25 |

FOREIGN PATENT DOCUMENTS

| JP | 2003-500935 | 7/2003 |
|---|---|---|
| JP | 2005-175649 | 6/2005 |

OTHER PUBLICATIONS

Office Action (Reason for Rejection) from Japanese Patent Office, mail date Apr. 27, 2010.

* cited by examiner

*Primary Examiner*—Gerald Gauthier
(74) *Attorney, Agent, or Firm*—Stites & Harbison, PLLC; Juan Carlos A. Marquez, Esq.

(57) ABSTRACT

There is a need for providing a content to a user in process of a voice call without interrupting the conversation. A presence server is provided to manage positions, in a virtual space, of a user of each of voice telecommunication terminals and an advertisement sound source provided by an advertisement server. A media server applies a stereophonic process to voice data for each of the other voice telecommunication terminals correspondingly to a relative position between a user of each of the other voice telecommunication terminals and a user of the relevant voice telecommunication terminal. Further, the media server applies a stereophonic process to acoustic data for the advertisement sound source correspondingly to a relative position between the advertisement sound source and a user of the relevant voice telecommunication terminal. In this manner, stereophonically processed data is synthesized to generate voice call data for the relevant voice telecommunication terminal.

8 Claims, 23 Drawing Sheets

FIG. 3

POSITION INFORMATION STORAGE UNIT  103

| USER/SOUND-SOURCE ID | ADDRESS | VIRTUAL POSITION INFORMATION (COORDINATE AND DIRECTION) |
|---|---|---|
| publicity A | ******** | COORDINATE: (x1, y1, z1), DIRECTION: h1 |
| taro | ******** | COORDINATE: (x3, y3, z3), DIRECTION: h3 |
| hanako | ******** | COORDINATE: (x4, y4, z4), DIRECTION: h4 |
| jiro | ******** | COORDINATE: (x5, y5, z5), DIRECTION: h5 |
| ...... | ...... | ...... |

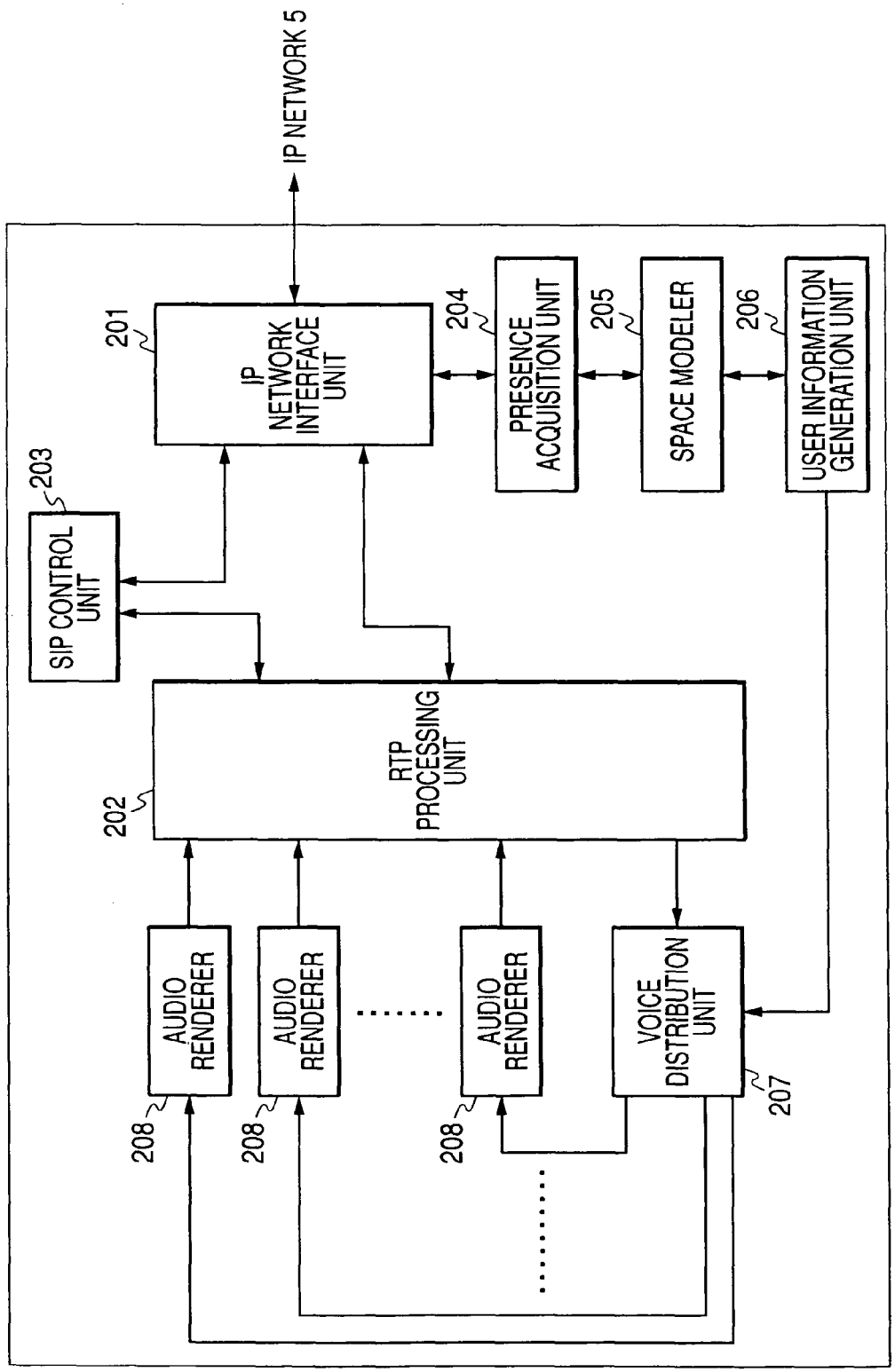

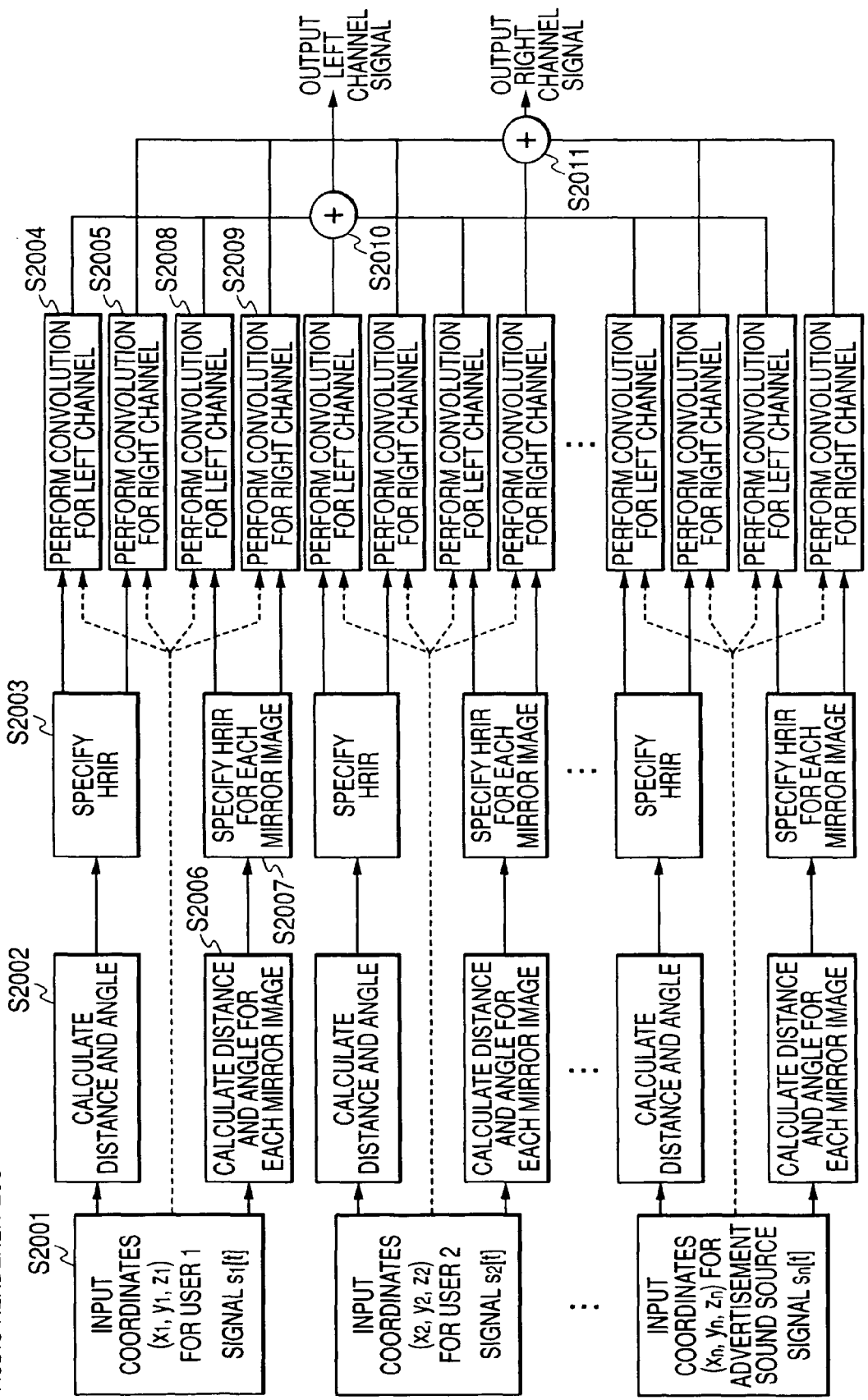

- ● ADVERTISEMENT SOUND SOURCE OR OTHER USERS
- ○ OWN USER

ADVERTISEMENT SOUND SOURCE 3

FIG. 10

ADVERTISEMENT INFORMATION STORAGE UNIT 305

| USER/SOUND-SOURCE ID 3051 | ACOUSTIC DATA 3052 | ADVERTISEMENT TIME SLOT 3053 |
|---|---|---|
| publicity A | ************ | 2005/08/15 7:00 TO 9:00 |
| publicity B | ************ | 2005/08/15 11:00 TO 15:00 |
| publicity C | ************ | 2005/08/15 20:00 TO 24:00 |
| …… | …… | …… |

3050

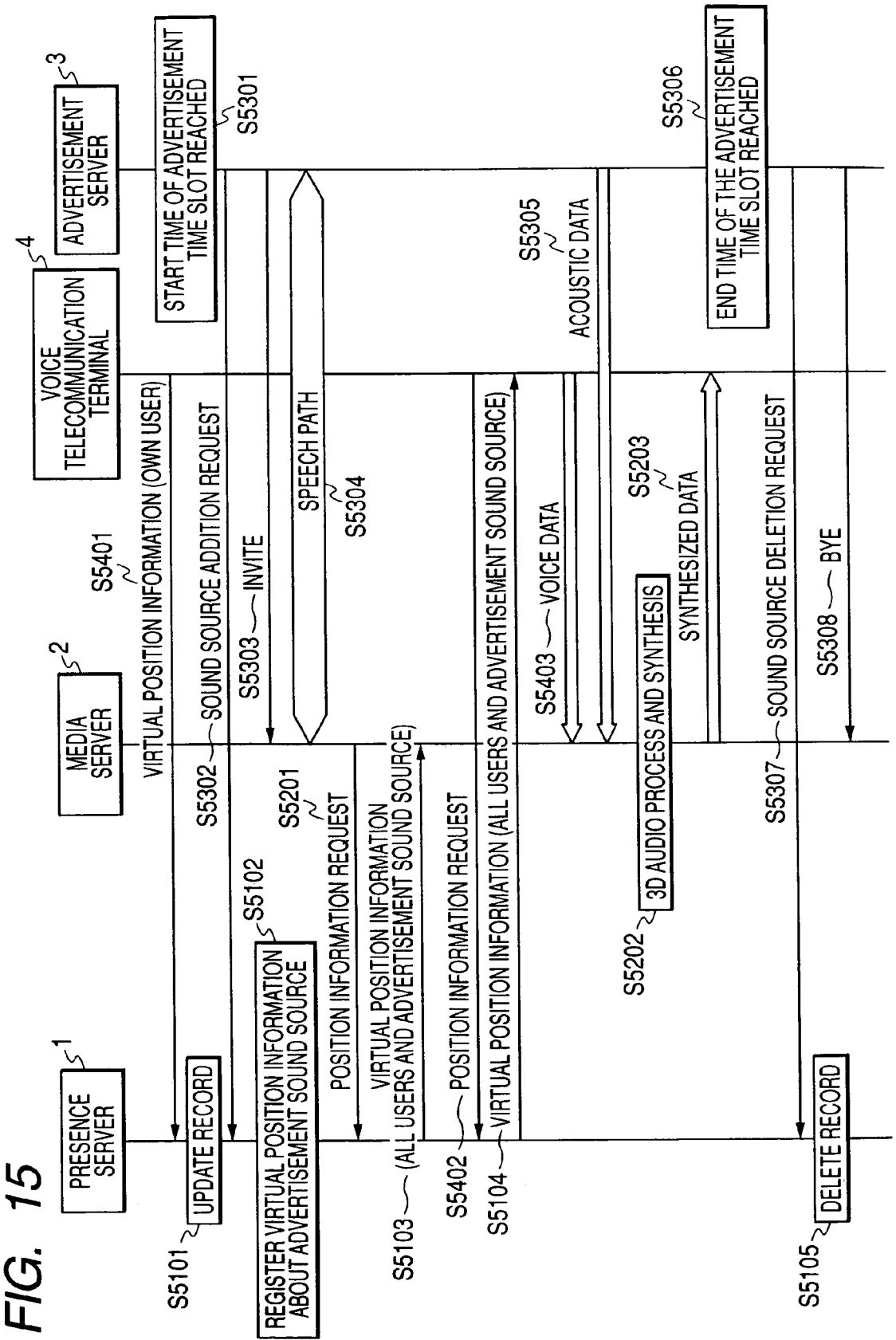

FIG. 16

ADVERTISEMENT INFORMATION STORAGE UNIT 305A

| USER/SOUND-SOURCE ID | ACOUSTIC DATA | ADVERTISEMENT TIME SLOT | CATEGORY |
|---|---|---|---|
| publicity A | ********** | 2005/08/15 7:00 TO 9:00 | CAR |
| publicity B | ********** | 2005/08/15 11:00 TO 15:00 | TRAVEL |
| publicity C | ********** | 2005/08/15 20:00 TO 24:00 | MUSIC |
| ...... | ...... | ...... | ...... |

FIG. 17

POSITION INFORMATION STORAGE UNIT 103A

| USER/SOUND-SOURCE ID | ADDRESS | VIRTUAL POSITION INFORMATION (COORDINATE AND DIRECTION) | PREFERENCE |
|---|---|---|---|
| publicity A | ********** | COORDINATE: (x1, y1, z1), DIRECTION: h1 | CAR |
| taro | ********** | COORDINATE: (x3, y3, z3), DIRECTION: h3 | TRAVEL |
| hanako | ********** | COORDINATE: (x4, y4, z4), DIRECTION: h4 | CONCERT |
| jiro | ********** | COORDINATE: (x5, y5, z5), DIRECTION: h5 | MEAL |
| ...... | ...... | ...... | ...... |

FIG. 18

POSITION INFORMATION STORAGE UNIT 103B _1030B_

| USER/SOUND-SOURCE ID _1031_ | ADDRESS _1032_ | VIRTUAL POSITION INFORMATION (COORDINATE AND DIRECTION) _1033_ | ADVERTISEMENT POLICY _1035_ |
|---|---|---|---|
| publicity A | ******** | COORDINATE: (x1, y1, z1), DIRECTION: h1 | — |
| taro | ******** | COORDINATE: (x3, y3, z3), DIRECTION: h3 | ADVERTISEMENT PROVIDED |
| hanako | ******** | COORDINATE: (x4, y4, z4), DIRECTION: h4 | ADVERTISEMENT PROVIDED |
| jiro | ******** | COORDINATE: (x5, y5, z5), DIRECTION: h5 | NO ADVERTISEMENT |
| …… | | | …… |

FIG. 19

ADVERTISEMENT INFORMATION STORAGE UNIT 305C _3050C_

| USER/SOUND-SOURCE ID _3051_ | ACOUSTIC DATA _3052_ | ADVERTISEMENT TIME SLOT _3053_ | MOVEMENT RULE _3055_ |
|---|---|---|---|
| publicity A | ************* | 2005/08/15 7:00 TO 9:00 | UPDATE |
| publicity B | ************* | 2005/08/15 11:00 TO 15:00 | FIX |
| publicity C | ************* | 2005/08/15 20:00 TO 24:00 | CYCLE $P_1 \rightarrow P_2 \rightarrow P_3$ |
| …… | | | …… |

FIG. 20

POSITION INFORMATION STORAGE UNIT 103C 1030C

| USER/SOUND-SOURCE ID 1031 | ADDRESS 1032 | VIRTUAL POSITION INFORMATION (COORDINATE AND DIRECTION) 1033 | MOVEMENT RULE 1035 |
|---|---|---|---|
| publicity A | ********** | COORDINATE: (x1, y1, z1), DIRECTION: h1 | UPDATE |
| taro | ********** | COORDINATE: (x3, y3, z3), DIRECTION: h3 | – |
| hanako | ********** | COORDINATE: (x4, y4, z4), DIRECTION: h4 | – |
| jiro | ********** | COORDINATE: (x5, y5, z5), DIRECTION: h5 | – |
| …… | …… | …… | …… |

FIG. 21 PRESENCE SERVER 1C

FIG. 23

ADVERTISEMENT INFORMATION STORAGE UNIT 305D

| USER/SOUND-SOURCE ID | ACOUSTIC DATA | GUIDE INFORMATION |
|---|---|---|
| publicity A | ********** | NEW CAR INFORMATION |
| publicity B | ********** | TRAVEL GUIDE |
| publicity C | ********** | NEW ALBUM INFORMATION |
| ...... | ...... | ...... |

FIG. 24

REQUEST STORAGE UNIT 307

| REQUEST ACCEPTANCE DATE AND TIME | REQUESTING USER (USER/SOUND-SOURCE ID) | REQUESTED USER (USER/SOUND-SOURCE ID) |
|---|---|---|
| 05/08/20 8:00 | taro | publicity A |
| 05/08/20 8:10 | jiro | publicity B |
| 05/08/20 8:30 | taro | publicity C |
| 05/08/20 8:35 | hanako | publicity A |
| ...... | ...... | ...... |

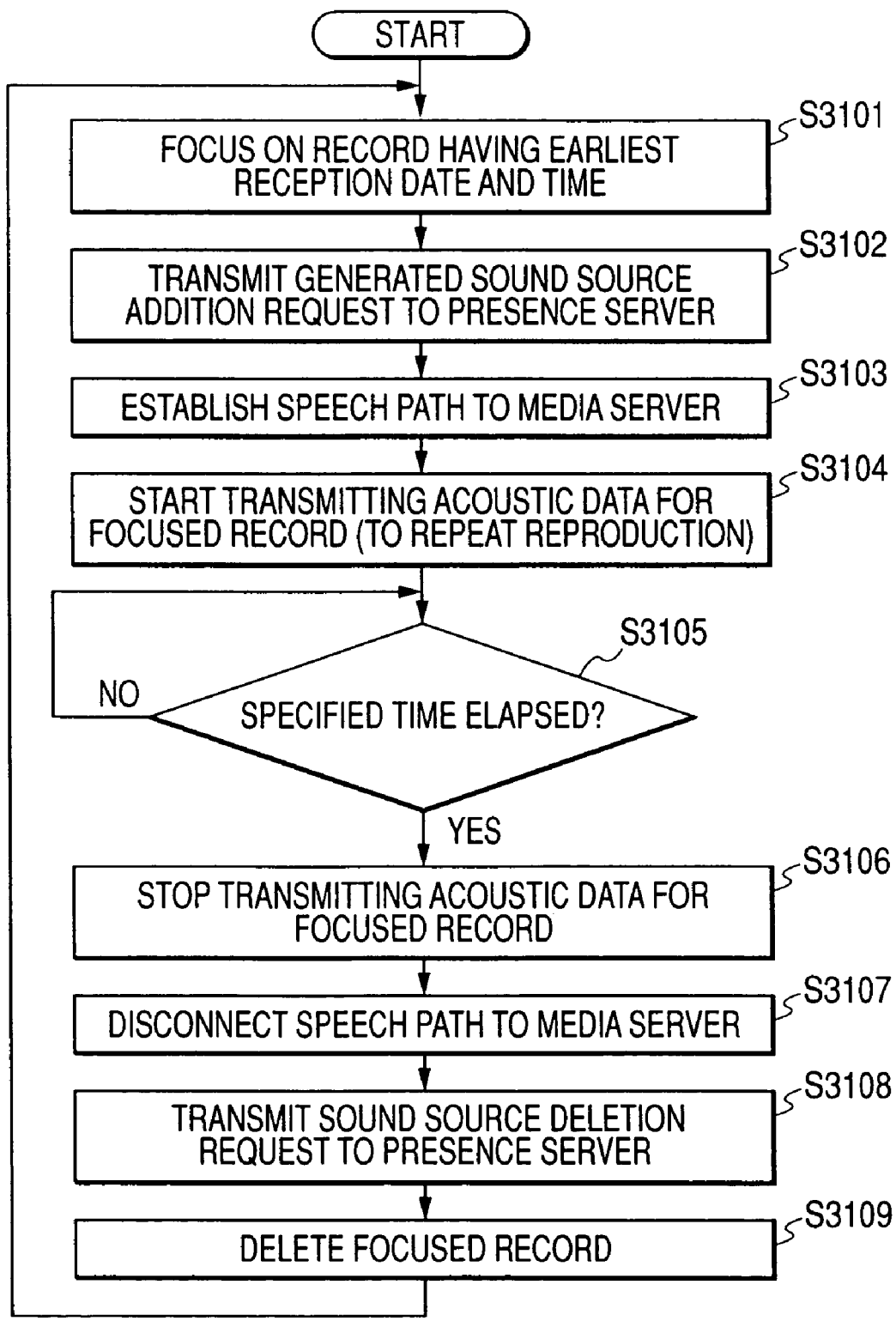

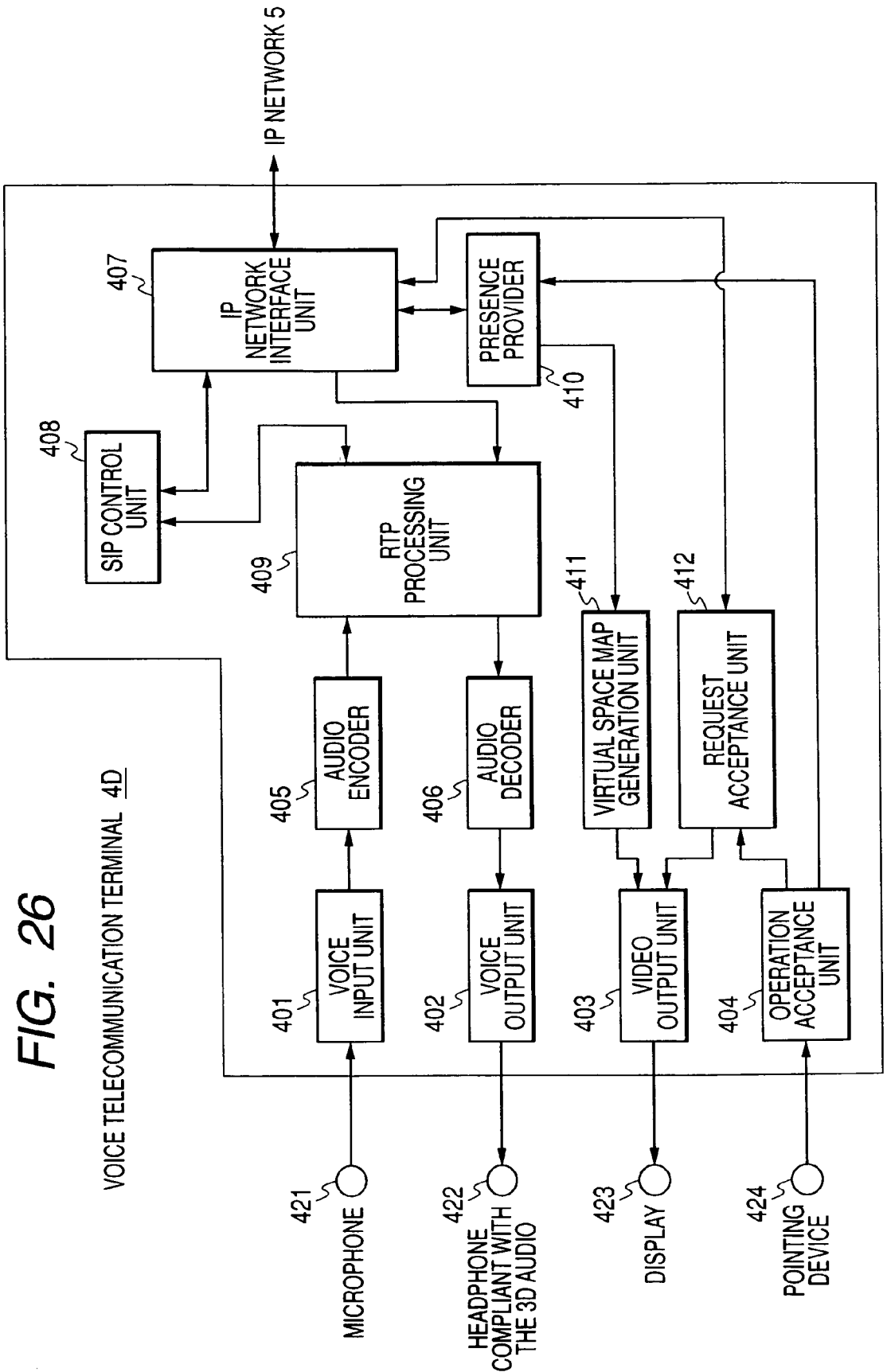

FIG. 27

REQUEST ACCEPTANCE SCREEN
4120

| USER/SOUND-SOURCE ID (4121) | GUIDE INFORMATION (4122) |
|---|---|
| publicity A | NEW CAR INFORMATION |
| publicity B | TRAVEL GUIDE |
| publicity C | NEW ALBUM INFORMATION | ns, a content server to provide a sound source for each of the
VOICE CALL SYSTEM AND METHOD OF PROVIDING CONTENTS DURING A VOICE CALL

CLAIM OF PRIORITY

The present application claims priority from Japanese patent application JP 2005-265283 filed on Sep. 13, 2005, the content of which is hereby incorporated by reference into this application.

FIELD OF THE INVENTION

The present invention relates to a voice call system and more particularly to a technology for providing contents such as advertisement to a user in process of a voice call.

BACKGROUND OF THE INVENTION

There has been a conventional practice to provide advertisement using media such as television and radio broadcasting. The advertisement using television and radio broadcasting allocates time intervals for the advertisement between programs and between time-shared portions of a program. A broadcast signal for the advertisement is transmitted during the allocated time (the National Association of Commercial Broadcasters in Japan, ed. Broadcasting handbook—Practical knowledge about the civil law as a culture background: TOYO KEIZAI INC., August 1997, pp. 340-343).

SUMMARY OF THE INVENTION

The above-mentioned conventional broadcasting takes no count of using voice calls as media. When the time-sharing advertisement using television and radio broadcasting is applied to a voice call, the conversation is interrupted to cause an unnatural effect.

The present invention has been made in consideration of the foregoing. It is therefore an object of the present invention to provide contents such as advertisement for a user in process of voice call without interrupting the conversation.

To solve the above-mentioned problem, the invention inserts advertisement in a space division fashion instead of a time division fashion. A presence server is provided to manage positions of a user of each of the voice telecommunication terminals and a sound source for providing contents in a virtual space. The presence server stereophonically processes voice data for the other voice telecommunication terminals than a relevant voice telecommunication terminal correspondingly to a relative position between the each of the other voice telecommunication terminals and the user of the relevant voice telecommunication terminal. In addition, the presence server stereophonically processes acoustic data for the sound source correspondingly to a relative position between the sound source and the user of the relevant voice telecommunication terminal. In this manner, the presence server synthesizes the stereophonically processed voice data for each of the other voice telecommunication terminals with the stereophonically processed acoustic data for the sound source to generate voice call data for the relevant voice telecommunication terminal. At this time, the presence server configures a position of the sound source in the virtual space for each of the voice telecommunication terminals so that the user of the relevant voice telecommunication terminal can distinguish the position of the sound source from the position of the user of each of the other voice telecommunication terminals.

For example, the invention provides a voice call system that includes a plurality of voice telecommunication terminals, a content server to provide a sound source for each of the plurality of voice telecommunication terminals, and a presence server to manage positions of users of the plurality of voice telecommunication terminals and a sound source provided by the content server in a virtual space, the voice call system having: a presence acquisition unit that acquires information about positions of users of the plurality of voice telecommunication terminals and the sound source provided by the content server in a virtual space from the presence server; and an audio renderer provided for each of the voice telecommunication terminals.

The audio renderer performs a process for applying a stereophonic process to voice data for each of voice telecommunication terminals other than a voice telecommunication terminal corresponding to the audio renderer in accordance with a relative position between each of users of the other voice telecommunication terminals and a user of the voice telecommunication terminal corresponding to the audio renderer, in which the presence acquisition unit acquires position information to specify the relative position and a stereophonic process to acoustic data from a sound source provided by the content server in accordance with a relative position between the sound source and the user of the voice telecommunication terminal, in which the presence acquisition unit acquires position information to specify the relative position; and a process for synthesizing the stereophonically processed voice data for each of the other voice telecommunication terminals other than the voice telecommunication terminal corresponding to the audio renderer with acoustic data for the sound source to generate voice call data for the voice telecommunication terminal corresponding to the audio renderer.

The presence server includes a position information management unit that determines a position of the sound source in a virtual space in terms of each of the plurality of voice telecommunication terminals so that a user of a relevant voice telecommunication terminal can distinguish the position of the sound source in the virtual space from positions of users of the other voice telecommunication terminals.

The position information management unit may determine a position of the sound source in the virtual space as follows so that the user of the relevant user can distinguish the position of the sound source in the virtual space from a position of the user of another voice telecommunication terminal. For example, a distance between the user of the voice telecommunication terminal and the sound source in the virtual space can be longer than a distance between the user of the relevant voice telecommunication terminal and a user of another nearest voice telecommunication terminal.

Alternatively, the position information management unit may determine a position of the sound source in the virtual space as follows so that the user of the relevant user can distinguish the position of the sound source in the virtual space from a position of the user of another voice telecommunication terminal. For example, a direction to the sound source viewed from the user of the voice telecommunication terminal can be configured to deviate from at least a direction to a user of the nearest another voice telecommunication terminal viewed from the relevant voice telecommunication terminal at a specified angle.

According to an embodiment of the invention, voice data for each of the other voice telecommunication terminal and acoustic data for the sound source are stereophonically processed to generate synthesized data for each voice telecommunication terminal based on relative positions in a virtual space among a user of a relevant voice telecommunication terminal, a user of each of the voice telecommunication terminals other than the relevant voice telecommunication terminal, and the sound source to provide contents the synthesized data is assumed to be voice call data for the relevant voice telecommunication terminal. An intended party and the sound source are placed in divided portions within the virtual space, i.e., at positions and/or orientations that allow the voice telecommunication terminal user to distinguish between the intended party and the sound source. Even when the user is simultaneously supplied with the voice data for the intended party and the acoustic data for the sound source and both data are synthesized in the voice call data, the user can selectively or simultaneously hear them by distinguishing one from the other. Accordingly, it is possible to audiovisually provide contents such as advertisement for users in process of voice call without interrupting the conversation.

BRIEF DESCRIPTION OF THE DRAWINGS

FIG. 3 schematically shows a registration content of a position information storage unit 103;

FIG. 6 is a schematic construction diagram of a media server 2;

FIG. 7 illustrates processes of an audio renderer 208;

FIG. 10 schematically shows a registration content of an advertisement information storage unit 305;

FIG. 15 schematically shows operations of the voice call system as shown in FIG. 1;

FIG. 16 schematically shows a registration content of an advertisement information storage unit 305A;

FIG. 17 schematically shows a registration content of a position information storage unit 103A;

FIG. 18 schematically shows a registration content of a position information storage unit 103B;

FIG. 19 schematically shows a registration content of an advertisement information storage unit 305C;

FIG. 20 schematically shows a registration content of a position information storage unit 103C;

FIG. 23 schematically shows a registration content of an advertisement information storage unit 305D;

FIG. 24 schematically shows a registration content of a request storage unit 307;

FIG. 25 shows an operational flow of an advertisement information position control unit 304D;

FIG. 26 is a schematic construction diagram of a voice telecommunication terminal 4D;

FIG. 27 shows an example of a request acceptance screen;

DETAILED DESCRIPTION OF THE PREFERRED EMBODIMENTS

Embodiments of the present invention will be described.

First Embodiment

Figure 1:
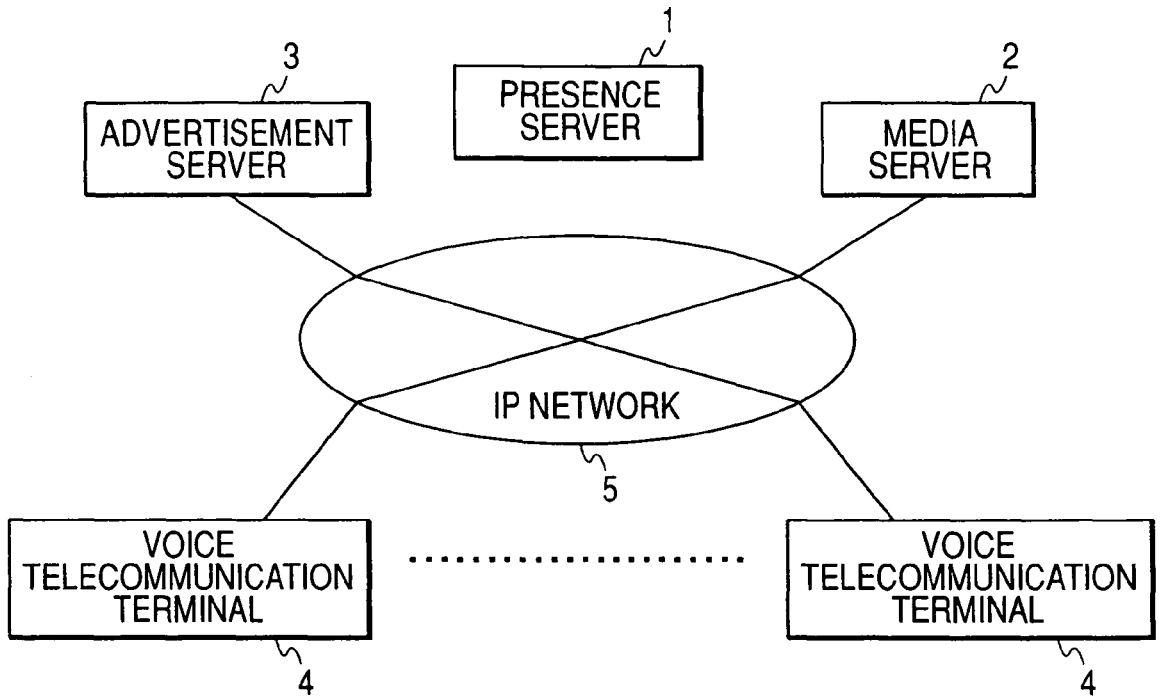
FIG. 1 is a construction diagram of a voice telecommunication system according to a first embodiment of the invention.

FIG. 1 is a construction diagram of a voice call system according to a first embodiment of the invention. As shown in FIG. 1, the voice call system according to the embodiment includes a presence server 1, a media server 2, an advertisement server 3, and multiple voice telecommunication terminals 4 that are connected to each other via an IP (Internet Protocol) network 5.

The presence server 1 manages an advertisement sound source provided from the advertisement server 3 and position information about a user of each voice telecommunication terminal in a virtual space. A user of each voice telecommunication terminal 4 creates the virtual space for voice call communication. For example, virtual space properties include: a space size; a ceiling height; reflection coefficients, colors, textures, and resonance characteristics of a wall and a ceiling; and an absorption factor of sound due to air in the space.

Figure 2:
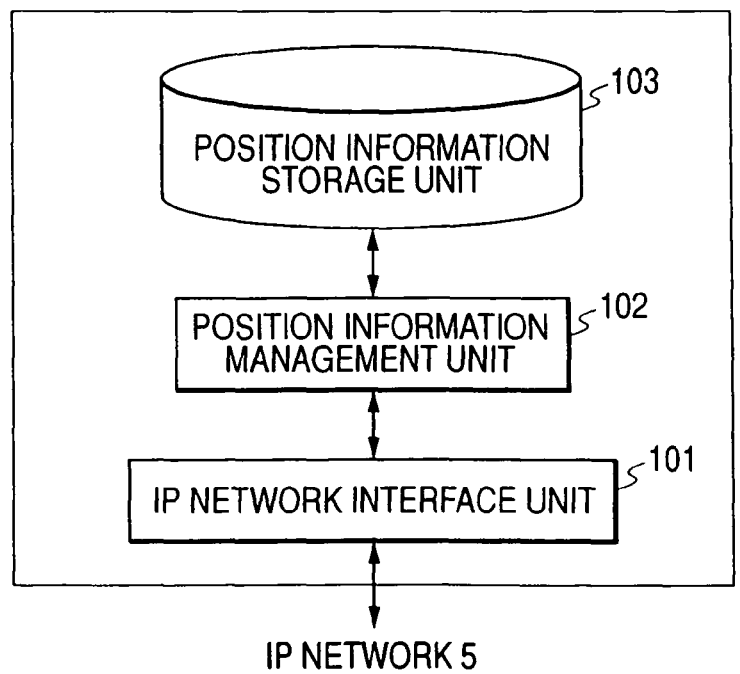
FIG. 2 is a schematic construction diagram of a presence server 1.

FIG. 2 is a schematic construction diagram of the presence server 1.

As shown in FIG. 2, the presence server 1 includes an IP network interface unit 101 for connection to an IP network 5, a position information management unit 102, and a position information storage unit 103.

FIG. 3 schematically shows a registration content of the position information storage unit 103. As shown in FIG. 3, the position information storage unit 103 stores records 1030 about users of an advertisement sound source provided by the advertisement server 3 and the voice telecommunication terminals 4. The record 1030 includes fields 1031, 1032, and 1033. The field 1031 registers a user/sound-source ID as identification information. The field 1032 registers an address (such as an SIP-URI or IP address) on the IP network 5. The field 1033 registers virtual position information, i.e., position information in the virtual space about the user of the advertisement sound source or the voice telecommunication terminal identified by the user/sound-source ID. The virtual position information includes the following in the virtual space: coordinate information about the current position of the advertisement sound source or the user in the virtual space; and direction information about orientation (direction of utterance or sound generation) of the advertisement sound source or the user.

The position information management unit 102 receives virtual position information about a user of the voice telecommunication terminal 4 from the voice telecommunication terminal 4. Based on the virtual position information, the position information management unit 102 updates the record 1030 about the user of the voice telecommunication terminal 4. The record 1030 is registered in the position information storage unit 103. The position information storage unit 103 registers the record 1030 about the user of each voice telecommunication terminal 4. The record 1030 contains virtual position information. Based on the virtual position information, the position information management unit 102 determines virtual position information about an advertisement sound source provided from the advertisement server 3. Based on the determined virtual position information, the position information management unit 102 registers the record 1030 about the advertisement sound source provided from the advertisement server 3 in the position information storage unit 103. Further, the position information management unit 102 responds to a position information request from media server 2 or the voice telecommunication terminal 4. The position information management unit 102 then transmits each record 1030 registered in the position information storage unit 103 to the transmission origin of the position information request.

Figure 4:
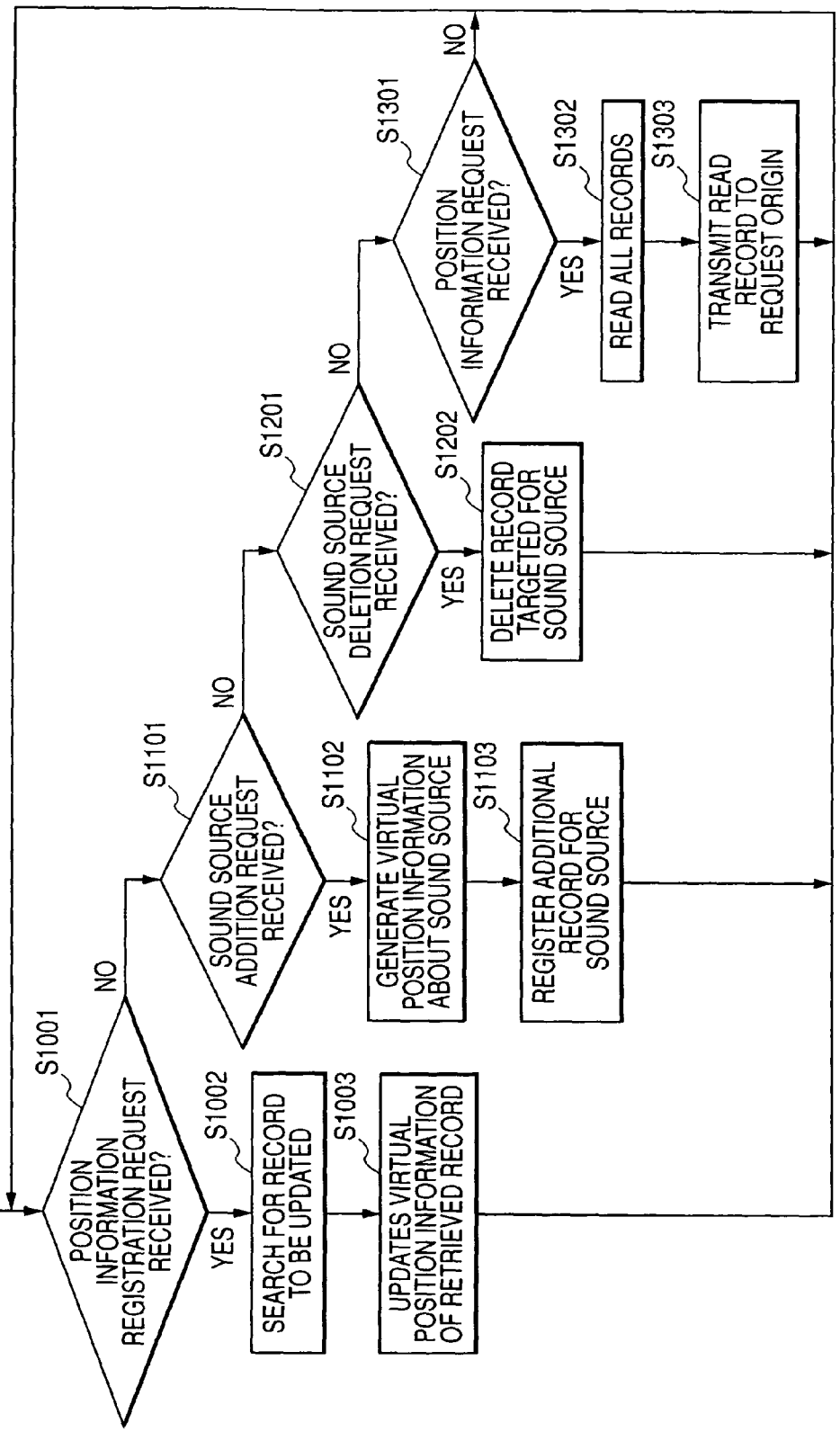
FIG. 4 illustrates an operation flow of the presence server 1.

FIG. 4 illustrates an operation flow of the presence server 1.

The position information management unit 102 receives a position information registration request including the user/sound-source ID and the virtual position information from the voice telecommunication terminal 4 via the IP network interface unit (S1001). The position information management unit 102 searches the position information storage unit 103 for the record whose field 1031 registers the user/sound-source ID (S1002). When the virtual position information is registered to the field 1033 in the retrieved record 1030, the position information management unit 102 updates the virtual position information to virtual position information contained in the position information registration request (S1003).

The position information management unit 102 receives a sound source addition request including the user/sound-source ID from the advertisement server 3 via the IP network interface unit 101 (S1101). The position information storage unit 103 stores virtual position information about the user of each voice telecommunication terminal 4. Based on the virtual position information, the position information management unit 102 generates virtual position information about the advertisement sound source provided from the advertisement server 2 as the request transmission origin (S1102).

The position information storage unit 103 stores the record 1030 about the user of the voice telecommunication terminal 4. Specifically, the position information management unit 102 performs the following process for each record 1030 to generate the virtual position information about the advertisement sound source. The virtual position information registered to the field 1033 in the focused record 1030 specifies a position in the virtual space. This position is assumed to be a focused position.

Figure 5A:
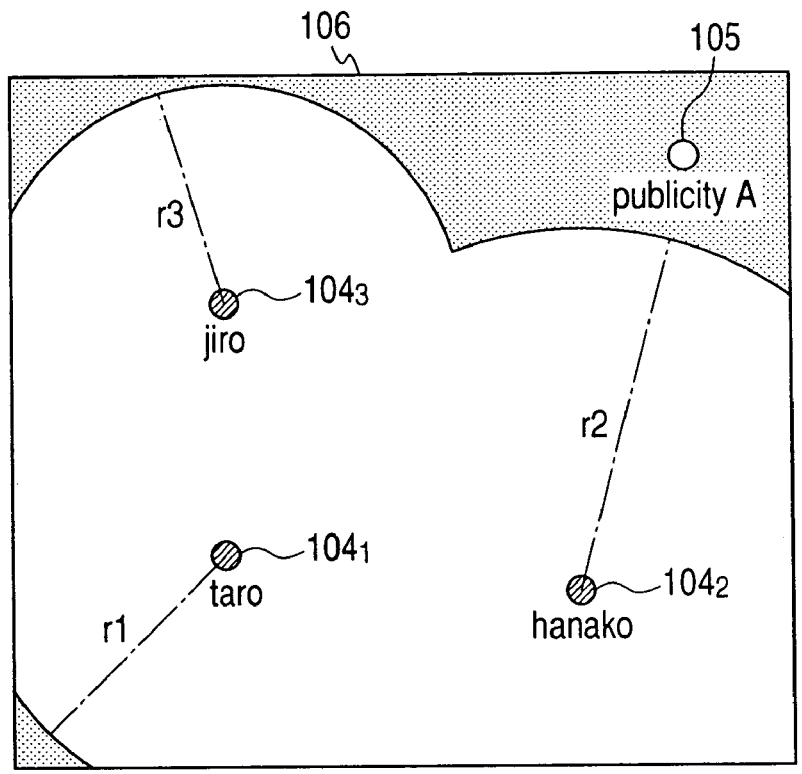
FIG. 5 illustrates a position and an orientation of as advertisement sound source in a virtual space.

The virtual position information registered to the field 1033 specifies a position in the virtual space 106. As shown in FIG. 5A, the position information management unit 102 first detects the record 1030 about a user of another voice telecommunication terminal 4 whose position is nearest to the focused position. According to the example in FIG. 5A, the position information management unit 102 detects position (jiro) 104$_3$ corresponding to focused position (taro) 104$_1$. The position information management unit 102 detects position (taro) 104$_1$ corresponding to focused position (hanako) 104$_2$. The position information management unit 102 detects position (taro) 104$_1$ corresponding to focused position (jiro) 104$_3$. Viewed from the focused position, the position information management unit 102 detects an area distant from the position in the virtual space 106 specified by the virtual position information registered to the field 1032 in the detected record 1030. The position information management unit 102 determines this area to be an advertisement sound source installation area candidate. According to the example in FIG. 5A, the position information management unit 102 selects an advertisement sound source installation area candidate for the focused position (taro) 104$_1$ outside the range with radius r1 around the focused position (taro) 104$_1$. The position information management unit 102 selects an advertisement sound source installation area candidate for the focused position (hanako) 104$_2$ outside the range with radius r1 around the focused position (hanako) 104$_2$. The position information management unit 102 selects an advertisement sound source installation area candidate for the focused position (jiro) 104$_3$ outside the range with radius r1 around the focused position (jiro) 104$_3$.

Figure 5B:
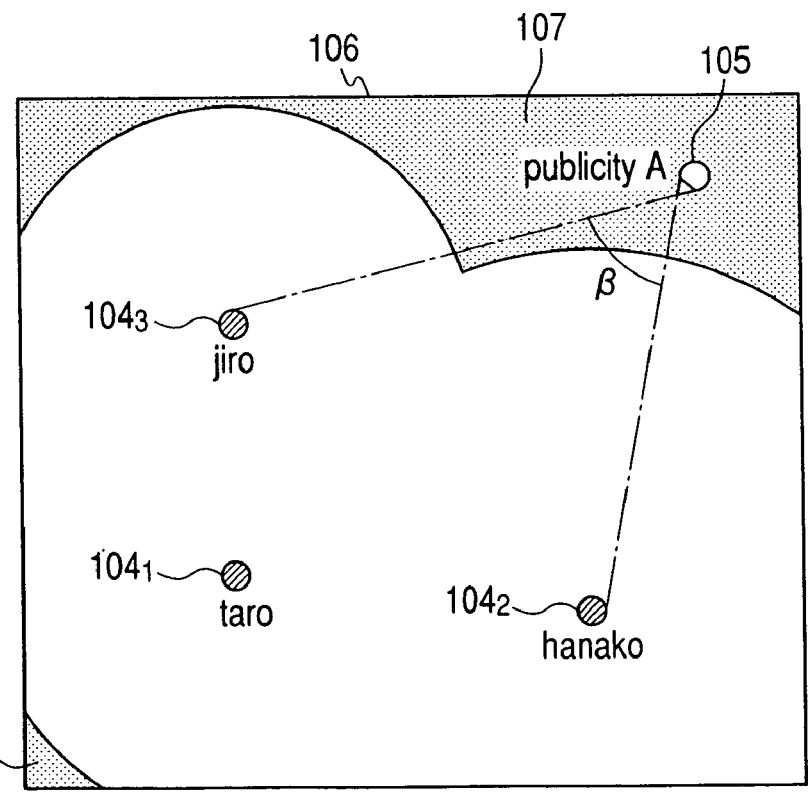

As shown in FIG. 5B, the position information management unit 102 finds an overlap range 107 of the advertisement sound source installation area candidates determined for the records 1030 about the users of the voice telecommunication terminals 4, where the records 1030 are stored in the position information storage unit 103. The position information management unit 102 determines a given position 105 within the range 107 as a position (coordinate) in the virtual space for the advertisement sound source (publicity A) provided by the advertisement server 3 as the sound source addition request transmission origin. The users of the voice telecommunication terminals 4 are viewed from the determined position to assume angle β between the left-end user (hanako) and the right-end user (jiro). So as to minimize angle β, the position information management unit 102 determines an orientation of the advertisement sound source (publicity A) in the virtual space.

In this manner, the position information management unit 102 generates the virtual position information about the advertisement sound source provided by the advertisement server 3 as the sound source addition request transmission origin. The position information management unit 102 then adds a new record 1030 to the position information storage unit 103. The position information management unit 102 registers a user/sound-source ID contained in the field 1031 of the record 1030. The position information management unit 102 registers the address of the request transmission origin. The position information management unit 102 then registers the generated virtual position information to the field 1033 (S1103).

The position information management unit 102 receives a sound source deletion request containing the user/sound-source ID from the advertisement server 3 via the IP network interface unit 101 (S1201). From the position information storage unit 103, the position information management unit 102 retrieves the record whose field 1031 registers the user/sound-source ID. The position information management unit 102 then deletes that record 1030 from the position information storage unit 103 (S1202).

The position information management unit 102 receives a position information request from the media server 2 or the voice telecommunication terminal 4 via the IP network interface unit 101 (S1301). The position information management unit 102 reads all the records 1030 from the position information storage unit 103 (S1302) and returns the records to the requesting transmission origin (S1303).

Let us return to FIG. 1 for further description. The media server 2 receives voice data from the voice telecommunication terminals 4 other than the relevant voice telecommunication terminal 4. The media server 2 applies a stereophonic process to the received voice data correspondingly to relative positions between the user of the relevant voice telecommunication terminal 4 and users of the other voice telecommunication terminals 4 managed by the presence server 1. The media server 2 receives acoustic data for the advertisement sound source from the advertisement server 3. The media server 2 applies a stereophonic process to the received acoustic data correspondingly to relative positions between the user of the relevant voice telecommunication terminal 4 and the advertisement sound source managed by the presence server 1. In this manner, the media server 2 synthesizes the stereophonically processed voice data of the other voice telecommunication terminals 4 with the acoustic data of the advertisement sound source to generate voice call data for the relevant voice telecommunication terminal 4.

FIG. 6 is a schematic construction diagram of the media server 2.

As shown in FIG. 6, the media server 2 includes: an IP network interface unit 201 for connection to the IP network 5; an RTP (Real-time Transport Protocol) processing unit 202; an SIP (Session Initiation Protocol) processing unit 203; a presence acquisition unit 204; a space modeler 205; a user information generation unit 206; a voice distribution unit 207; and an audio renderer 208 provided for each voice telecommunication terminal 4.

The SIP control unit 203 establishes a speech path between the advertisement server 3 and each voice telecommunication terminal 4 via the IP network interface unit 201.

The RTP processing unit 202 receives acoustic data or voice data from the advertisement server 3 and the voice telecommunication terminal 4, respectively. The RTP processing unit 202 outputs the received data as well as its transmission origin address to the voice distribution unit 207. The audio renderer 208 outputs synthesized data corresponding to each of the voice telecommunication terminals 4. The RTP processing unit 202 transmits the output synthesized data to each of the voice telecommunication terminals 4 via the speech path.

The presence acquisition unit 204 periodically transmits a position information request to the presence server 1 via the IP network interface unit 201. As a response, the presence acquisition unit 204 receives the records (virtual position information) 1030 about the advertisement server 3 and the voice telecommunication terminals 4 from the presence server 1. The presence acquisition unit 204 notifies the space modeler 205 of the received records 1030.

The space modeler 205 receives the records 1030 about the advertisement server 3 and the voice telecommunication terminals 4 from the presence acquisition unit 204 and holds the received records 1030. In addition, the space modeler 205 outputs the records 1030 to the user information generation unit 206.

The user information generation unit 206 performs the following process for each of the voice telecommunication terminals 4. That is, the user information generation unit 206 specifies the record 1030 containing the address of the relevant voice telecommunication terminal 4 from the records 1030 received from the space modeler 205. The user information generation unit 206 transmits the specified record 1030 as own-user information to the voice distribution unit 207. The user information generation unit 206 assumes the records other than the specified record 1030 to be other-user/sound-source information. The user information generation unit 206 associates the other-user/sound-source information with the own-user information and transmits the other-user/sound-source information to the voice distribution unit 207.

The voice distribution unit 207 receives acoustic data and voice data from the RTP processing unit 202 for each voice telecommunication terminal 4. Out of these acoustic data and voice data, the voice distribution unit 207 extracts data used for synthesized data to be transmitted to the relevant voice telecommunication terminal 4. Specifically, the voice distribution unit 207 performs the following process for each voice telecommunication terminal 4.

Out of the own-user information received from the user information generation unit 206, the voice distribution unit 207 detects own-user information containing the user/sound-source ID of the targeted voice telecommunication terminal 4. The voice distribution unit 207 assumes the detected own-user information to be own-user information about the relevant voice telecommunication terminal 4. The voice distribution unit 207 outputs the own-user information to the audio renderer 208 associated with the relevant voice telecommunication terminal 4. Out of the other-user/sound-source information received from user information generation unit 206, the voice distribution unit 207 detects other-user/sound-source information associated with the relevant own-user information. The voice distribution unit 207 detects acoustic data and voice data from those received from the RTP processing unit 502 so that the detected acoustic data and voice data can be used for synthesized data to be transmitted to the relevant voice telecommunication terminal 4. The voice distribution unit 207 detects the acoustic data and voice data based on addresses contained in the other-user/sound-source information associated with the own-user information. The voice distribution unit 207 associates the detected acoustic data and voice data with the other-user/sound-source information containing the address used for the data detection. The voice distribution unit 207 outputs the acoustic data and voice data to the audio renderer 208 associated with the relevant voice telecommunication terminal 4.

The audio renderer 208 receives each acoustic data and voice data as well as other-user/sound-source information from the voice distribution unit 508. The audio renderer 208 receives the own-user information from the voice distribution unit 508. The audio renderer 208 buffers the received acoustic data and voice data to synchronize (associate) them with each other. The audio renderer 208 stereophonically processes the synchronized acoustic data and voice data based on relative positions among the advertisement sound source, the other users, and the own user. The acoustic data and voice data are provided with virtual position information about the other-user/sound-source information and the relevant own-user information. The virtual position information specifies the relative position. The synthesized data (3D audio data) contains signal data (signal string) for two channels (left and right channels). The audio renderer 208 outputs the synthesized data to the RTP processing unit 202.

The audio renderer 208 will be described in more detail.

The 3D audio technology represents the sound direction and distance using an HRIR (Head Related Impulse Response) and artificial echo. The HRIR (Head Related Impulse Response) mainly represents an impulse response, i.e., how the sound varies around a human head. The artificial echo is generated from the virtual environment such as a room. The HRIR is determined by a distance between the sound source and the human head and angles (horizontal and vertical angles) therebetween. It is assumed that the audio renderer 208 previously stores HRIR values measured for the distances and angles using a dummy head. The HRIR values are measured for a left channel (the dummy head's left ear) and a right channel (the dummy head's right ear). Different HRIR values are used to represent the sense of directions such as left and right, forward and backward, and up and down.

FIG. 7 illustrates processes of the audio renderer 208. The audio renderer 208 performs the following calculation with respect to each of the acoustic data and voice data as well as the other-user/sound-source information transmitted from the voice distribution unit 207.

The audio renderer 208 accepts each of the other-user/sound-source information and signal string $s_i[t]$ (t=1, 2, 3, and so on) of the acoustic data or voice data associated with the other-user/sound-source information from the voice distribution unit 207. In addition, the audio renderer 208 accepts the own-user information from the voice distribution unit 207. The virtual position information is contained in each of the other-user/sound-source information and the own-user information. The audio renderer 208. configures these virtual position information as parameters used for the 3D audio process (stereophonic process) applied to signal string $s_i[t]$ (t=1, 2, 3, and so on) of the acoustic data or voice data associated with the other-user/sound-source information (S2001).

The audio renderer 208 calculates direct sound and reflected sound as echo in the acoustic data or voice data for each of the other-user/sound-source information. With respect to the direct sound, the audio renderer 208 uses the position information configured to be parameters to calculate a distance and an angle (azimuth) between the own user and the advertisement sound source having the other-user/sound-source information or between the own user and the other user in the virtual space (S2002). The audio renderer 208 then specifies an HRIR corresponding to the distance and the angle for the own user out of the prestored HRIR values (S2003). The audio renderer 208 may use an HRIR value calculated by interpolating the prestored HRIR value.

The audio renderer 208 performs the convolution calculation using the signal string provided at S2001 and the HRIR for the left channel specified at S2003 to generate a left channel signal (S2004). Similarly, the audio renderer 208 performs the convolution calculation using the signal string provided at S2001 and the HRIR for the right channel specified at S2003 to generate a right channel signal (S2005).

With respect to the reverberating sound, the audio renderer 208 calculates an echo to be added using the position information configured to be parameters at S2001 (S2006 and S2007). That is, the audio renderer 208 calculates the echo based on how the sound varies (impulse response) due to virtual space attributes. The echo calculation will be described below.

An echo is composed of early reflection (early reflection) and late echo (late reverberation). The early reflection is generally considered to be more important than the late echo in terms of the sense formation (recognition) as to a distance to another user or the size of a room (virtual space). Reportedly, it is possible to hear several tens of early reflections from a wall, ceiling, and floor in a room as an actual space depending on conditions several to 100 milliseconds after hearing the direct sound, i.e. . , the sound directly generated from a sound source. A cubic room causes only six early reflections at a time. When a room is complexly shaped or contains furniture and the like, the number of reflected sounds increases. Further, it is possible to hear the sound reflected several times against the wall and the like.

An example of calculating the early reflection is the image source method. For example, see Allen, J. B. and Berkley, A., "Image Method for efficiently Simulating Small-Room Acoustics", J. Acoustical Society of America, Vol. 65, No. 4, pp. 943-950, April 1979. A simple image source method assumes that the room's wall, ceiling, and floor have mirror surfaces. The method calculates the reflected sound as the sound from an image of the sound source opposite the mirror surface.

Figure 8:
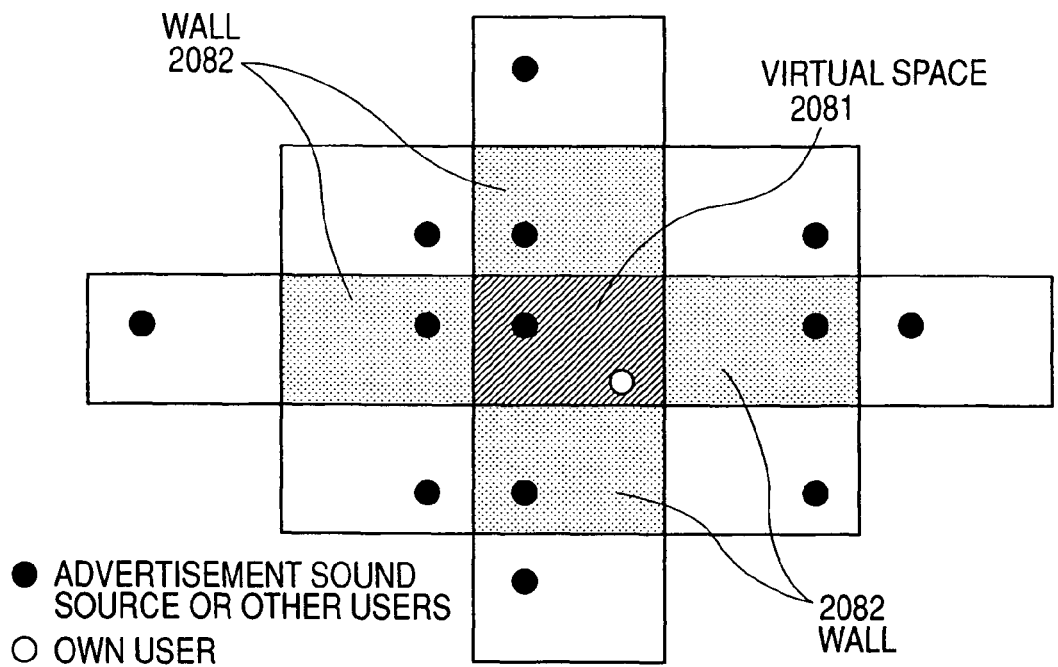
FIG. 8 schematically shows a two-dimensional image source method with a ceiling and a floor omitted.

FIG. 8 schematically shows a two-dimensional image source method with a ceiling and a floor omitted for simplicity of description. An original virtual space 2081 exists at the center. The virtual space 2081 contains the own user and the advertisement sound source (or another user) . Twelve mirror images including room walls 2082 are drawn around the sound room 2081. The number of mirror images is not limited to 12 and may be larger or smaller.

The audio renderer 208 calculates the distance and the direction between each image of the advertisement sound sources (or other users) and the own user. At this time, it is assumed that the sound directly travels to the own user (audience) from each image of the advertisement sound sources (or the other users) in the mirror images. Since the sound intensity is inversely proportional to the distance, the audio renderer 208 attenuates each sound volume in accordance with the distance. Let us suppose that the wall reflectivity is $\alpha$ ($0<\alpha<1$) . When a sound sample is reflected n times against the wall, the audio renderer 208 further attenuates its sound volume by multiplying it and $\alpha^n$ together.

The value for reflectivity $\alpha$ is assumed to be approximately 0.6. A reason for using the value of approximately 0.6 is to acquire an echo (i.e., a ratio between the direct sound and the reflected sound) sufficient for the own user to recognize a distance up to the advertisement sound source (or the other user) . As another reason, using too large a value for $\alpha$ blurs the own user's sense of direction.

Out of the prestored HRIR values, the audio renderer 208 specifies an HRIR value corresponding to the distance and the angle between the own user and each image of the advertisement sound source (or another user) (S2007). Since the reflected sound reaches the human head from different directions, the HRIR value to be applied needs to differ from the HRIR value for the direct sound specified at S2003.

A large amount of calculation is needed when the convolution is performed (S2007 and S2008) for each of many reflected sounds using different HRIR values to be described later. To prevent the calculation amount from increasing, the reflected sound calculation may use an HRIR value corresponding to the sound source provided at the front irrespectively of actual sound source directions. A small amount of calculation is needed to replace the HRIR calculation by calculating only a time difference (ITD: interaural time difference) and an intensity difference (IID: interaural intensity difference).

The audio renderer 208 performs the convolution calculation using the signal string provided at S2001 and the HRIR for the left channel specified at S2007 to generate an echo for the left channel signal (S2008). Similarly, the audio renderer 208 performs the convolution calculation using the signal string provided at S2001 and the HRIR for the right channel specified at S2007 to generate an echo for the right channel signal (S2009).

The audio renderer 208 calculates left channel signals for all the advertisement sound sources and the other users in this manner and then sums the signals (S2010) . The left channel signal contains the direct sound calculated at S2004 and the reflected sound calculated at S2008. The audio renderer 208 calculates right channel signals for all the advertisement sound sources and the other users in this manner and then sums the signals (S2011). The right channel signal contains the direct sound calculated at S2005 and the reflected sound calculated at S2009.

The HRIR calculation (S2003 and S2007) is performed for each data equivalent to one RTP packet. However, the convolution calculation (S2004, S2005, S2008, and S2009) causes a portion carried over to the next one packet of data. For this reason, the audio renderer 208 needs to hold the specified HRIR or the input signal string until processing the next one packet of data.

In this manner, the voice distribution unit 207 transmits acoustic data and voice data for the advertisement sound source and the other users. The audio renderer 208 processes the transmitted acoustic data and voice data to perform the above-mentioned calculations such as adjusting the sound volume, superposing an echo or a reverberating sound, and filtering. The audio renderer 208 provides acoustic effects to sounds audible at positions in the own user's virtual space. That is, the audio renderer 208 performs the process consequent to virtual space attributes and relative positions in terms of the advertisement sound source and the other users to generate a stereophonic effect that orients sounds.

Let us return to FIG. 1 for further description. The advertisement server 3 transmits acoustic data of the advertisement sound source to the media server 2 via the speech path established between advertisement server 3 and the media server 2. The transmitted acoustic data is supplied to each of the voice telecommunication terminals 4.

Figure 9:
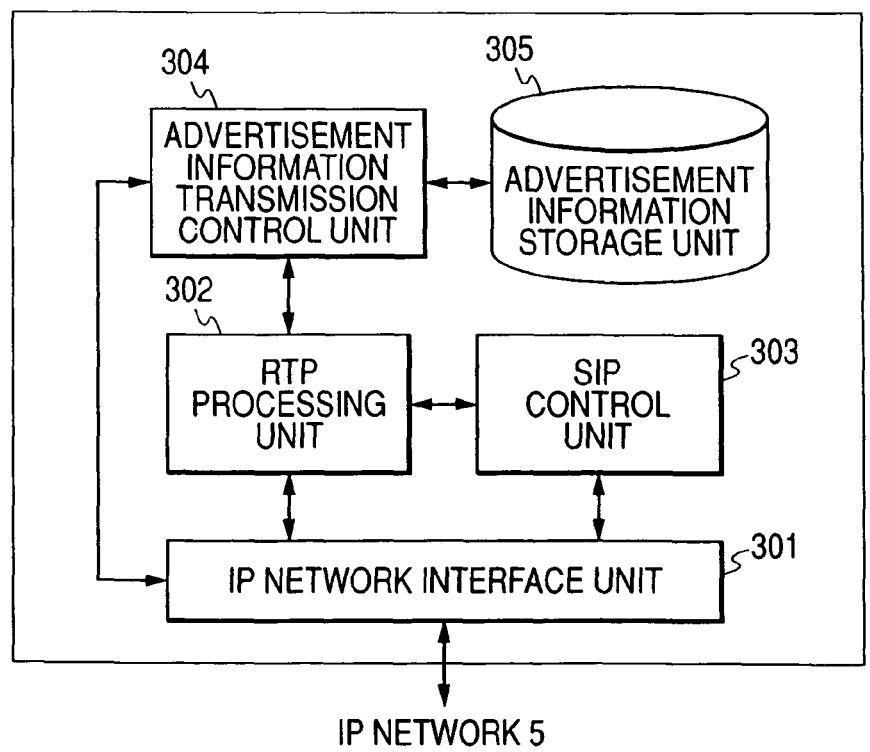
FIG. 9 is a schematic construction diagram of an advertisement server 3.

FIG. 9 is a schematic construction diagram of the advertisement server 3.

As shown in FIG. 9, the advertisement server 3 includes: an IP network interface unit 301 for connection with the IP network 5; an RTP processing unit 302; an SIP processing unit 303; and an advertisement information storage unit 305.

The SIP control unit 303 establishes a speech path between the advertisement server 3 and the media server 2 via the IP network interface unit 301.

As will be described later, acoustic data of the advertisement sound source is received from the advertisement information transmission control unit 304. The RTP processing unit 302 transmits the received acoustic data to the media server 2 via the speech path established between the advertisement server 3 and the media server 2.

The advertisement information storage unit 305 registers acoustic data of the advertisement sound source as well as an advertisement condition. FIG. 10 schematically shows the advertisement information storage unit 305. As shown in FIG. 10, a record 3050 is registered correspondingly to each acoustic data of the advertisement sound source. The record 3050 contains fields 3051, 3052, and 3053. The field 3051 registers a user/sound-source ID as identification information about acoustic data of the advertisement sound source. The field 3052 registers acoustic data of the advertisement sound source. The field 3053 registers a transmission time slot for acoustic data of the advertisement sound source. The embodiment registers the records 3050 in the order of transmission time slots.

Figure 11:
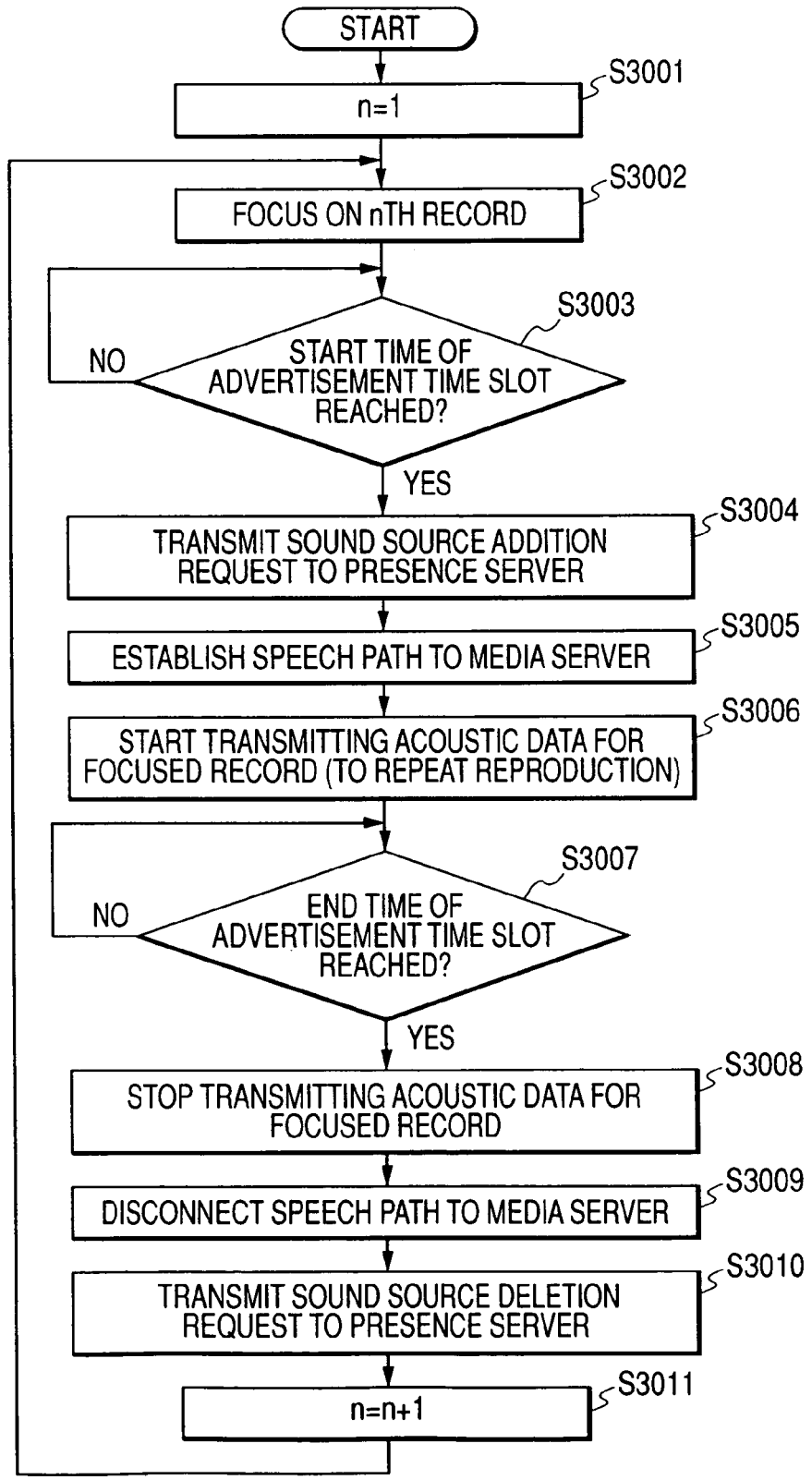
FIG. 11 shows an operational flow of an advertisement information position control unit 304.

While the advertisement information storage unit 305 stores acoustic data of the advertisement sound source, the advertisement information transmission control unit 304 controls transmission of the stored acoustic data to the media server 2. FIG. 11 shows an operational flow of the advertisement information position control unit 304.

The advertisement information transmission control unit 304 sets counter value n to 1 (S3001).

The advertisement information transmission control unit 304 focuses on the nth record 3050 stored in the advertisement information storage unit 305 and determines it to be a focused record (S3002). Using a built-in timer and the like, the advertisement information transmission control unit 304 determines whether or not the current time reaches the start time of an advertisement time slot registered in the field 3053 of the focused record (S3003).

When the current time reaches the start time of the advertisement time slot (YES at S3003), the advertisement information transmission control unit 304 generates a sound source addition request containing the user/sound-source ID registered in the field 3050 of the focused record. The advertisement information transmission control unit 304 transmits the generated sound source addition request to the presence server 1 via the IP network interface unit 301 (S3004).

The advertisement information transmission control unit 304 allows the SIP control unit 303 to establish a speech path (S3550). In response to this, the SIP control unit 303 performs an SIP-compliant call control procedure in connection with the media server to establish a speech path to the media server 2. The advertisement information transmission control unit 304 reads the acoustic data registered in the field 3052 of the focused record from the advertisement information storage unit 350 and outputs the acoustic data to the RTP processing unit 302 (S3006). In response to this, the RTP processing unit 302 uses the speech path to the media server 2 to transmit the acoustic data received from the advertisement information transmission control unit 304 to the media server 2. Thereafter, the advertisement information transmission control unit 304 periodically repeats output of acoustic data stored in the field 3052 of the focused record to the RTP processing unit 302. As a result, the acoustic data is repeatedly transmitted to the media server 2.

Using a built-in timer and the like, the advertisement information transmission control unit 304 determines whether or not the current time reaches the end time of the advertisement time slot registered in the field 3053 of the focused record (S3007). When the current time reaches the end time of the advertisement time slot (YES at S3007), the advertisement information transmission control unit 304 stops the transmission of the acoustic data registered in the field 3052 of the focused record to the media server 2 using the speech path (S3008). The advertisement information transmission control unit 304 allows the SIP control unit 303 to disconnect the speech path (S3009). In response to this, the SIP control unit 303 disconnects the speech path to the media server 2 in accordance with SIP.

The advertisement information transmission control unit 304 generates a sound source deletion request containing the user/sound-source ID of the own advertisement server 3 and transmits the sound source deletion request to the presence server 1 via the IP network interface unit 301 (S3010). Thereafter, the advertisement information transmission control unit 304 increments counter value n by one (S3011) and then returns to S3002.

Let us return to FIG. 1 for further description. The voice telecommunication terminal 4 transmits virtual position information about the own user to the presence server 1. In addition, the voice telecommunication terminal 4 receives virtual position information about the advertisement sound source of the advertisement server 3 and virtual position information about the user of each voice telecommunication terminal 4 from the presence server 1. Based on the received virtual position information, the voice telecommunication terminal 4 generates and outputs a map that shows positions and orientations of users of the voice telecommunication terminals 4 and advertisement sound source of the advertisement server 3 in the virtual space.

The voice telecommunication terminal 4 transmits the own user's voice data to the media server 2 and receives synthesized data (3D audio data) from the media server 2. The voice telecommunication terminal 4 reproduces and outputs the received synthesized data.

Figure 12:
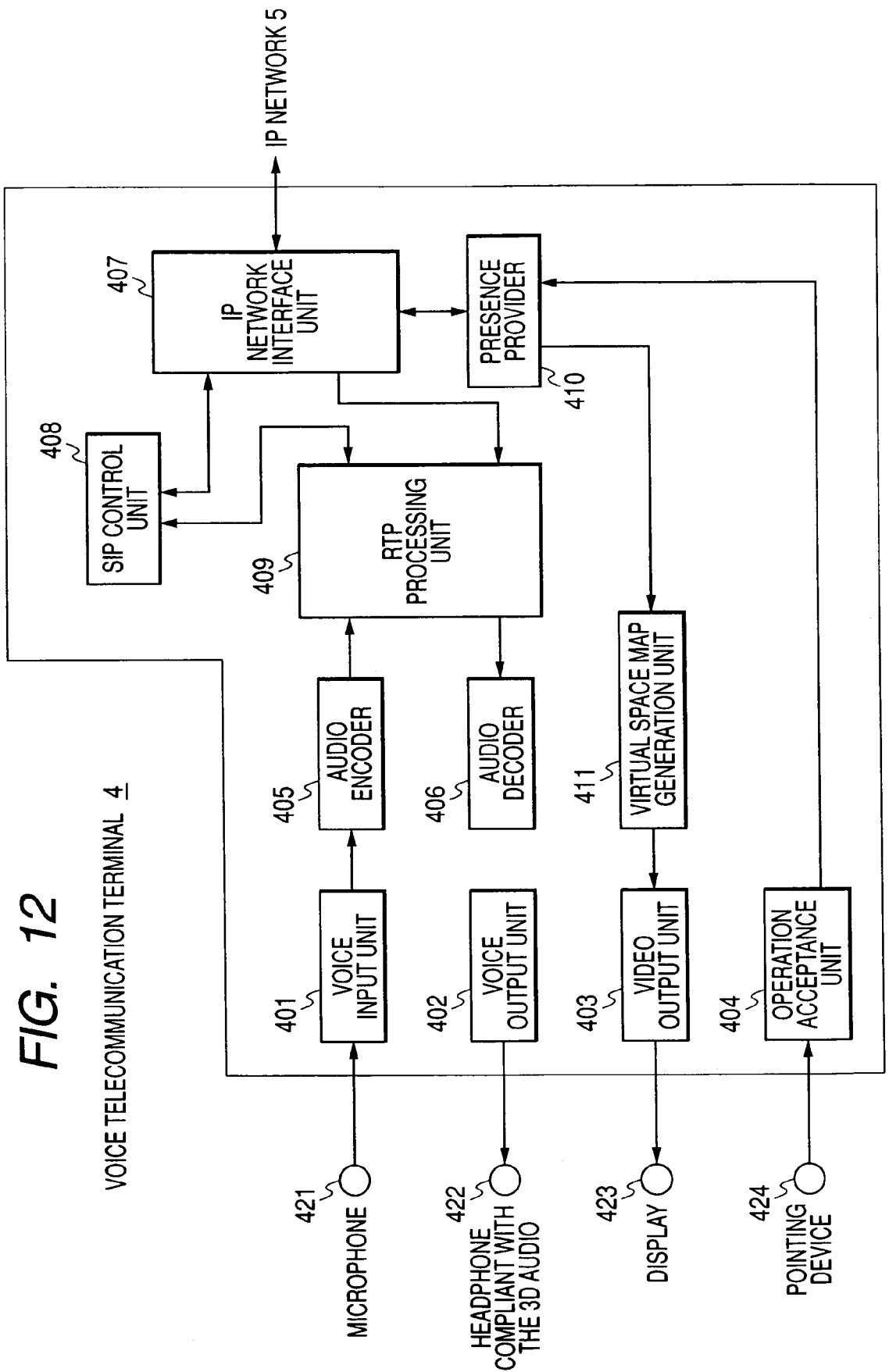
FIG. 12 is a schematic construction diagram of a voice telecommunication terminal 4.

FIG. 12 is a schematic construction diagram of the voice telecommunication terminal 4.

As shown in FIG. 12, the voice telecommunication terminal 4 includes: an voice input unit 401; an voice output unit 402; a video output unit 403; an operation acceptance unit 404; an audio encoder 405; an audio decoder 406; an IP network interface unit 407 for connection to the IP network 5; an SIP control unit 408; an RTP control unit 409; a presence provider 410; and a virtual space map generation unit 411.

The voice input unit 401 is supplied with an audio signal collected by a microphone 421. The voice output unit 402 is connected to a headphone (or a speaker) 422 compliant with the 3D audio (e.g., pseudo 5.1-channel audio). The video output unit 403 displays video of a virtual space map on a display 423. The virtual space map is output from the virtual space map generation unit 411 to be described later. The operation acceptance unit 404 accepts a user operation of a pointing device 424.

The audio encoder 405 encodes a voice signal supplied to the voice input unit 401 and outputs voice data to the RTP processing unit 409. The audio decoder 406 decodes synthesized data output from the RTP processing unit 409 and outputs 3D audio compliant voice signal to the voice output unit 402.

The SIP control unit 408 establishes a speech path to the media server 3 via the IP network interface unit 407. The RTP processing unit 409 stores voice data output from the audio encoder 405 in an RTP packet and transmits the RTP packet to the media server 2 via the speech path established by the SIP processing unit 408. The RTP processing unit 409 extracts the synthesized data (3D audio data) from the RTP packet received from the media server 2 via the speech path and outputs the synthesized data to the audio decoder 406.

The presence provider 410 determines own user's position (coordinate) and the line of sight (azimuth direction) in the relevant virtual space according to the predetermined virtual space attributes and own user's operation of the pointing device 424. The operation acceptance unit 404 accepts the own user's operations. The presence provider 410 transmits the own user's virtual position information including the determined position and line of sight to the virtual space map generation unit 411 and to the presence server 1 via the IP network interface unit 407. The presence provider 410 periodically transmits a position information request to the presence server 1 via the IP network interface unit 212. As its response, the presence provider 410 receives the records 1030 about the advertisement sound source and the other users from the presence server 1. The presence provider 410 notifies the received record 1030 to the virtual space map generation unit 411.

Figure 13:
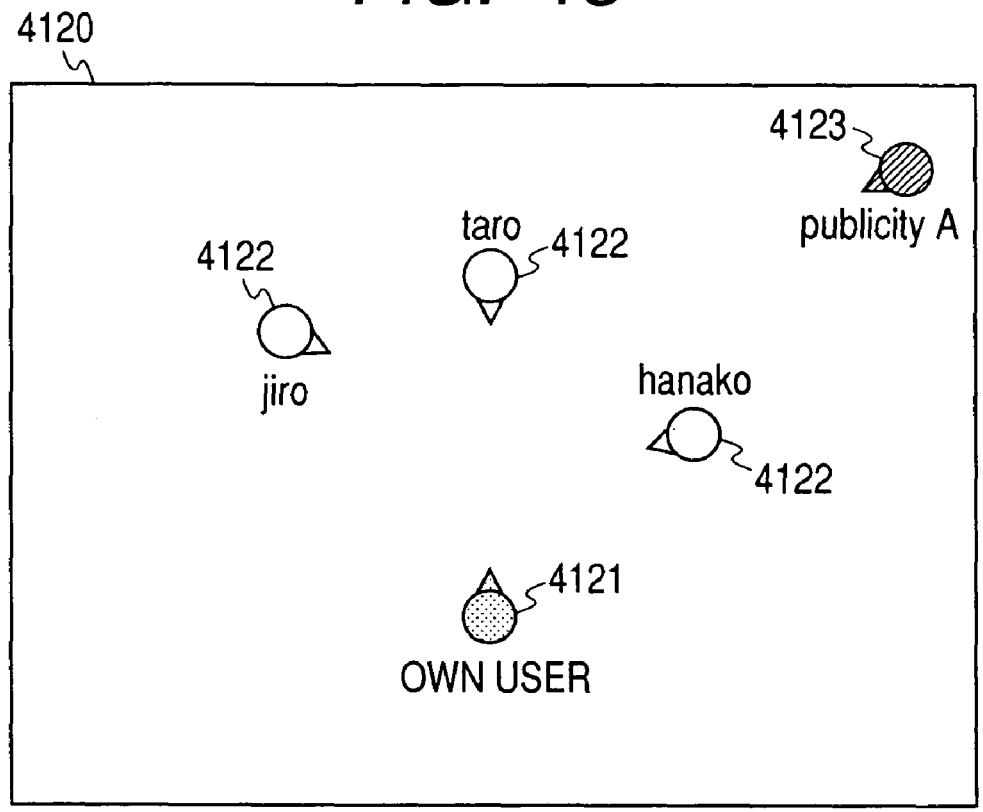
FIG. 13 shows an example of video for a virtual space map.

The virtual space map generation unit 411 receives the records 1030 about the own user, the advertisement sound source, and the other users from the presence provider 410. The records 1030 register the virtual position information. According to the virtual position information, the virtual space map generation unit 411 generates a virtual space map that presents positions and orientations of the own user, the advertisement sound source, and the other users. The virtual space map generation unit 411 outputs the video of the virtual space map to the video output unit 403. FIG. 13 shows an example of video for the virtual space map. As shown in FIG. 13, the display 423 displays the video of the virtual space map so as to be able to visualize positions and orientations of own user 4121, the other users 4122, and an advertisement sound source 4123.

Figure 14:
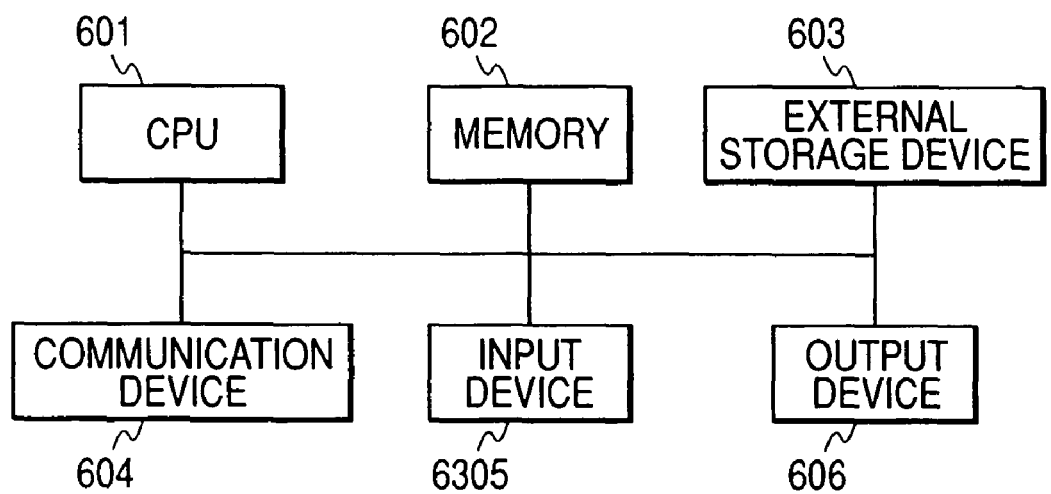
FIG. 14 exemplifies a hardware construction of devices constituting a voice call system.

A general computer system as shown in FIG. 14 can be used for the presence server 1, the media server 2, and the advertisement server 3 according to the above-mentioned construction. Such computer system includes: a CPU 601 to process and calculate data according to programs; memory 602 where the CPU 601 can directly read and write data; an external storage device 603 such as a hard disk drive; and a communication device 604 for data communication with an external system via the IP network 5. Specifically, the system represents a sever, a host computer, and the like.

The general computer system as shown in FIG. 14 can be used also for the voice telecommunication terminal 4 according to the above-mentioned construction. Such computer system includes: the CPU 601 to process and calculate data according to programs; the memory 602 where the CPU 601 can directly read and write data; the external storage device 603 such as a hard disk drive; the communication device 604 for data communication with an external system via the IP network 5; an input device 605 such as a keyboard and a mouse; and an output device 606 such as an LCD. Specifically, the computer system represents a PDA (Personal Digital Assistant), a PC (Personal Computer), and the like.

The CPU 601 executes specified programs loaded into or stored in the memory 602 to implement functions of the above-mentioned devices.

FIG. 15 schematically shows operations of the voice call system according to the first embodiment of the invention. Let us suppose that the voice telecommunication terminal 4 already establishes a speech path to the media server 2. Although FIG. 15 shows one voice telecommunication terminal 4, it is assumed that multiple voice telecommunication terminals 4 establish speech paths to the media server 2. The voice telecommunication terminals 4 are assumed to perform operations as shown in FIG. 15.

When a user operation changes a user position and orientation in the virtual space, the voice telecommunication terminal 4 generates new virtual position information. The voice telecommunication terminal 4 transmits a position information registration request including the virtual position information to the presence server 1 (S5401).

The presence server 1 receives the position information registration request from the voice telecommunication terminal 4. The presence server 1 then searches the position information storage unit 103 for the record 1030 that contains the requested transmission origin terminal's user/sound-source ID and the request transmission origin address. The presence server 1 updates the retrieved record 1030 using the virtual position information contained in the request (S5101).

The advertisement server 3 detects that the current time reaches the start time of the advertisement time slot registered in the record 3050 (focused record) that is stored in the advertisement information storage unit 305 and is to be processed next (S5301). The advertisement server 3 then transmits the sound source addition request containing the user/sound-source ID registered in the focused record to the presence server 1 (S5302). Thereafter, the advertisement server 3 transmits an INVITE message to the media server 2 (S5303) to establish a speech path to the media server 2 (S5304).

When receiving the sound source addition request from the advertisement server 3, the presence server 1 generates virtual position information about the advertisement sound source. The presence server 1 registers the virtual position information and the record 1030 containing the user/sound-source ID contained in the request to the position information storage unit 103 (S5102).

The media server 2 periodically transmits the position information request to the presence server 1 (S5201). Similarly, the voice telecommunication terminal 4 periodically transmits the position information request to the presence server 1 (S5402).

When receiving the position information request from the media server 2, the presence server 1 reads all records 1030 from the position information storage unit 103 and transmits them to the media server 2 (S5103). Similarly, when receiving the position information request from the voice telecommunication terminal 4, the presence server 1 reads all records 1030 from the position information storage unit 103 and transmits them to the voice telecommunication terminal 4 (S5104).

The voice telecommunication terminal 4 transmits own user's voice data to the media server 2 via the established speech path to the media server 2 (S5403). Similarly, the advertisement server 3 transmits the acoustic data registered in the focused record to the media server 2 via the speech path (established at S5304) to the media server 2 (S5403).

The media server 2 applies the 3D audio process to the acoustic data and the voice data received from the advertisement server 3 and the voice telecommunication terminal 4 based on the virtual position information about the advertisement sound source of the advertisement server 3 and about users of the voice telecommunication terminals 4. The virtual position information is received from the presence server 1. The media server 2 synthesizes the acoustic data and the voice data treated with the 3D audio process to generate synthesized data (S5202). The media server 2 also transmits the synthesized data to the voice telecommunication terminal 4 via the established speech path to the voice telecommunication terminal 4 (S5203).

The advertisement server 3 detects that the current time reaches the end time of the advertisement time slot registered in the focused record (S5306). The advertisement server 3 then transmits a sound source deletion request containing the user/sound-source ID registered in the focused record to the presence server 1 (S5307). Thereafter, the advertisement server 3 transmits an BYE message to the media server 2 (S5308) to disconnect the speech path to the media server 2.

When receiving the sound source deletion request from the advertisement server 3, the presence server 1 searches the position information storage unit 103 for the record 1030 containing the user/sound-source ID contained in the request or containing the transmission origin address of the request. The presence server 1 deletes the record 1030 from the position information storage unit 103 (S5105).

The first embodiment of the invention has been described.

The embodiment performs the 3D audio process to synthesize voice data for each of the other voice telecommunication terminals 4 with acoustic data for the advertisement server 3 correspondingly to each of the voice telecommunication terminals 4. The process is based on relative positions in the virtual space among users of the other voice telecommunication terminals 4, the advertisement sound source of the advertisement server 3, and the user of the relevant voice telecommunication terminal 4. The synthesized data is used as voice call data for the relevant voice telecommunication terminal 4. The following describes positions of the advertisement sound source and the voice telecommunication terminals 4 in the virtual space for the advertisement sound source. A distance between the user of the relevant voice telecommunication terminal 4 and the advertisement sound source in the virtual space is longer than a distance between the user of the relevant voice telecommunication terminal 4 and at least a user of another nearest voice telecommunication terminal 4. Accordingly, the user of the voice telecommunication terminal 4 can distinguish intended party's voice data synthesized with the call data from acoustic data of the advertisement sound source based on the relative positional relationship between the intended party and the advertisement sound source in the virtual space. The acoustic data of the advertisement sound source can be heard farther than the voice data of the user as the intended party. Consequently, it is possible to audiovisually provide the advertisement for users in process of voice call without interrupting the conversation.

Second Embodiment

While the first embodiment specifies a distance between the user of the voice telecommunication terminal 4 and the advertisement sound source provided by the advertisement server 3, the second embodiment varies that distance according to the user's preference.

The voice telecommunication system according to the second embodiment differs from that according to the first embodiment in that the presence server 1 and the advertisement server 3 are replaced by a presence server 1A and an advertisement server 3A. The other parts of the construction are the same as those of the first embodiment.

The advertisement server 3A differs from the advertisement server 3 according to the first embodiment in that the advertisement information transmission control unit 304 and the advertisement information storage unit 305 are replaced by an advertisement information transmission control unit 304A and an advertisement information storage unit 305A. The other parts of the construction are the same as those of the advertisement server 3.

The advertisement information storage unit 305A registers acoustic data of the advertisement sound source as well as advertisement conditions and categories. FIG. 16 schematically shows a registration content of the advertisement information storage unit 305A. As shown in FIG. 16, a record 3050A is registered for each acoustic data of the advertisement sound source. The record 3050A differs from the record 3050 according to the first embodiment (see FIG. 10) in that the record contains an additional field 3054 for registering an advertisement category.

At S3004 in FIG. 11, the advertisement information transmission control unit 304A transmits a sound source addition request to the presence server 1. At this time, the sound source addition request contains a category registered in the field 3054 of the focused record. The other operations are the same as those for the advertisement information transmission control unit 304 according to the first embodiment.

The presence server 1A differs from the presence server 1 according to the first embodiment in that the position information management unit 102 and the position information storage unit 103 are replaced by a position information management unit 102A and a position information storage unit 103A. The other parts of the construction are the same as those of the presence server 1.

FIG. 17 schematically shows a registration content of the position information storage unit 103A. As shown in FIG. 17, a record 1030A is recorded for each advertisement sound source provided by the advertisement server 3A and each user of the voice telecommunication terminal 4. The record 1030A differs from the record 1030 (see FIG. 3) according to the first embodiment in that the record contains an additional field 1034 for registering a user preference.

At S1103 in FIG. 4, the position information management unit 102A generates the virtual position information about the advertisement sound source provided by the advertisement server 2 as the relevant request transmission origin. This operation is based on the virtual position information about and the preference of the user of each voice telecommunication terminal 4 stored in the position information storage unit 103A and based on the category contained in the sound source addition request. Similarly to the first embodiment (see FIG. 5), the position information management unit 102A determines an advertisement sound source installation area candidate for each record 1030 about the user of the voice telecommunication terminal 4 and finds the overlap range 107 for the advertisement sound source installation area candidate. It should be noted that the position information storage unit 103A stores the record 1030. Thereafter, the position information management unit 102A checks whether or not the preference registered in the field 1034 belongs to the category contained in the sound source addition request in terms of each record 1030 about the user of the voice telecommunication terminal 4. It should be noted that the position information storage unit 103A stores the record 1030. The position information management unit 102A determines a position 105 in the virtual space for the advertisement sound source (publicity A) provided by the advertisement server 3 as the request transmission origin as follows. That is, the advertisement sound source is expected to be positioned closer to a position in the virtual space 106 specified by the virtual position information registered in the field 1033 of the record 1030 having the field 1034 assigned with the preference belonging to the category contained in the request than a position in the virtual space 106 specified by the virtual position information registered in the field 1033 of the record 1030 having the field 1034 assigned with the preference belonging to the category NOT contained in the request. In FIG. 5B, for example, let us suppose that the preference of the user (taro) belongs to the category of the advertisement sound source (publicity A) and that the preferences of the other users (jiro and hanako) do not belong to the category of the advertisement sound source (publicity A). In this case, the position information management unit 102A determines the position of the advertisement sound source (publicity A) in the virtual space to be within an area 107A in the overlap range 107. The users of the voice telecommunication terminals 4 are viewed from the determined position to assume angle β between the left-end user (hanako) and the right-end user (jiro). So as to minimize angle β, the position information management unit 102A determines an orientation of the advertisement sound source (publicity A) in the virtual space.

At S1103 in FIG. 4, the position information management unit 102A adds a new record 1030A to the position information storage unit 103. The position information management unit 102A registers the user/sound-source ID contained in the request in the field 1031 of the record 1030A, registers the address of the request transmission origin, registers the generated virtual position information in the field 1033, and registers the category contained in the request in the field 1034.

The second embodiment of the invention has been described.

The second embodiment provides the following effect in addition to the effect of the first embodiment. The advertisement sound source is disposed in the virtual space closer to a user having the preference belonging to the category of the advertisement sound source than a user not having the same. Accordingly, the advertisement is issued with a relatively small sound volume to a user who does not have the preference belonging to the category of the advertisement sound source. In addition, the advertisement is issued with a relatively large sound volume to a user who has the preference belonging to the category of the advertisement sound source. The advertising effectiveness can be improved.

Third Embodiment

The third embodiment enables each of the voice telecommunication terminals 4 to determine whether or not to output acoustic data from the advertisement sound source provided by the advertisement server 3 according to the above-mentioned first embodiment.

The voice telecommunication system according to the third embodiment differs from the voice telecommunication system in FIG. 1 according to the first embodiment in that the presence server 1 and the media server 2 are replaced by a presence server 1B and a media server 2B. The other parts of the construction are the same as those of the first embodiment.

The presence server 1B differs from the presence server 1 according to the first embodiment in that the position information management unit 102 and the position information storage unit 103 are replaced by a position information management unit 102B and a position information storage unit 103B. The other parts of the construction are the same as those of the presence server 1.

FIG. 18 schematically shows a registration content of the position information storage unit 103B. As shown in FIG. 18, a record 1030B is recorded for each advertisement sound source provided by the advertisement server 3 and each user of the voice telecommunication terminal 4. The record 1030B differs from the record 1030 (see FIG. 3) according to the first embodiment in that the record 1030B contains an additional field 1035 for registering an advertisement policy. The advertisement policy determines whether or not to output acoustic data of the advertisement sound source. Each user of the voice telecommunication terminal 4 is provided with the record 1030B. The field 1035 in the record 1030B registers "advertisement provided" to output acoustic data of the advertisement sound source or "no advertisement" not to output the same. A blank (null data) is placed in the field 1035 of the record 1030B for the advertisement sound source provided by the advertisement server 3.

At S1103 in FIG. 4, the position information management unit 102B adds a new record 1030B to the position information storage unit 1b3. The position information management unit 102B registers the user/sound-source ID contained in the request in the field 1031 of the record 1030B, registers the address of the request transmission origin, registers the generated virtual position information in the field 1033, and registers null data in the field 1035.

The media server 2B differs from the media server 2 in that the user information generation unit 206 is replaced by a user information generation unit 206B. The other parts of the construction are the same as those of the media server 2.

The user information generation unit 206B performs the following process for each of the voice telecommunication terminals 4. Out of records 1030B received from the space modeler 205, the user information generation unit 206B specifies the record 1030B that contains the address of the voice telecommunication terminal 4. The user information generation unit 206B transmits the specified record 1030B as own-user information to the voice distribution unit 207. The user information generation unit 206B checks for the advertisement policy registered in the field 1035 of the record 1030B as own-user information. When the advertisement policy indicates "advertisement provided," the user information generation unit 206B assumes the records 1030B other than the record 1030B as own-user information to be other-user/sound-source information. The user information generation unit 206B associates the records 1030B assumed to be other-user/sound-source information with the own-user information and transmits these records 1030B to the voice distribution unit 207. When the advertisement policy indicates "no advertisement," the user information generation unit 206B specifies the record 1030B whose field 1035 contains null data, i.e., the record 1030B for the advertisement sound source provided by the advertisement server 3. The user information generation unit 206B assumes this record 1030B and the records 1030B other than the record as the own-user information to be other-user/sound-source information. The user information generation unit 206B associates the records 1030B assumed to be other-user/sound-source information with the own-user information and transmits these records 1030B to the voice distribution unit 207.

The third embodiment of the invention has been described.

The third embodiment provides the following effect in addition to the effect of the first embodiment. That is, the third embodiment enables each of the voice telecommunication terminals 4 to determine whether or not to output acoustic data for the advertisement sound source provided by the advertisement server 3. It is possible to prevent advertisement acoustic data from being output from the voice telecommunication terminal of the user who refuses to receive the advertisement.

Fourth Embodiment

The fourth embodiment automatically moves the position in the virtual space for the advertisement sound source provided by the advertisement server 3 according to the first embodiment.

The voice telecommunication system according to the fourth embodiment differs from the voice telecommunication system according to the first embodiment in that the presence server 1 and the advertisement server 3 are replaced by a presence server 1C and an advertisement server 3C. The other parts of the construction are the same as those of the first embodiment.

The advertisement server 3C differs from the advertisement server 3 according to the first embodiment in that the advertisement information transmission control unit 304 and the advertisement information storage unit 305 are replaced by an advertisement information transmission control unit 304C and an advertisement information storage unit 305C. The other parts of the construction are the same as those of the advertisement server 3.

The advertisement information storage unit 305C stores not only acoustic data of the advertisement sound source, but also advertisement conditions and movement rules for the advertisement sound source. FIG. 19 schematically shows a registration content of the advertisement information storage unit 305C. As shown in FIG. 19, a record 3050C is registered for each acoustic data of the advertisement sound source. The record 3050C differs from the record 3050 (see FIG. 10) as described in the first embodiment in that the record 3050C contains an additional field 3055 for registering a movement rule for the advertisement sound source. The movement rules registered in the field 3055 include "Fix," "Update," and "Cycle." The "Fix" rule maintains the virtual position information determined when the record 3050C is registered. The "Update" rule periodically updates the virtual position information. The "Cycle" rule cycles through multiple specified positions in the virtual space. When "Cycle" is applied, the field 3055 also registers a cyclic schedule that specifies coordinate information in the virtual space, a cyclic sequence, and duration of stay for each of the multiple specified positions.

At S3004 in FIG. 11, the advertisement information transmission control unit 304C transmits a sound source addition request including the movement rule registered in the field 3055 of the focused record to the presence server 1C. The other operations are the same as those for the advertisement information transmission control unit 304 according to the first embodiment.

The presence server 1C differs from the presence server 1 according to the first embodiment in that the position information management unit 102 and the position information storage unit 103 are replaced by a position information management unit 102C and a position information storage unit 103C. The other parts of the construction are the same as those of the presence server 1.

FIG. 20 schematically shows a registration content of the position information storage unit 103C. As shown in FIG. 20, a record 1030C is registered for the advertisement sound source provided by the advertisement server 3C and each of the voice telecommunication terminals 4. The record 1030C differs from the record 1030 (see FIG. 3) as described in the first embodiment in that the record 1030C contains an additional field 1035 for registering a movement rule for the advertisement sound source. A blank (null data) is placed in the field 1035 of the record 1030B for the user of each of the voice telecommunication terminals 4.

The position information management unit 102C performs the following process in addition to the process performed by the position information management unit 102 according to the first embodiment. Depending on needs, the position information management unit 102C updates the virtual position information registered in the field 1033 according to the movement rule registered in the field 1035 of the record 1030C for the advertisement sound source provided by the advertisement server 3C. It should be noted that the position information storage unit 103 registers the record 1030C.

Figure 21:
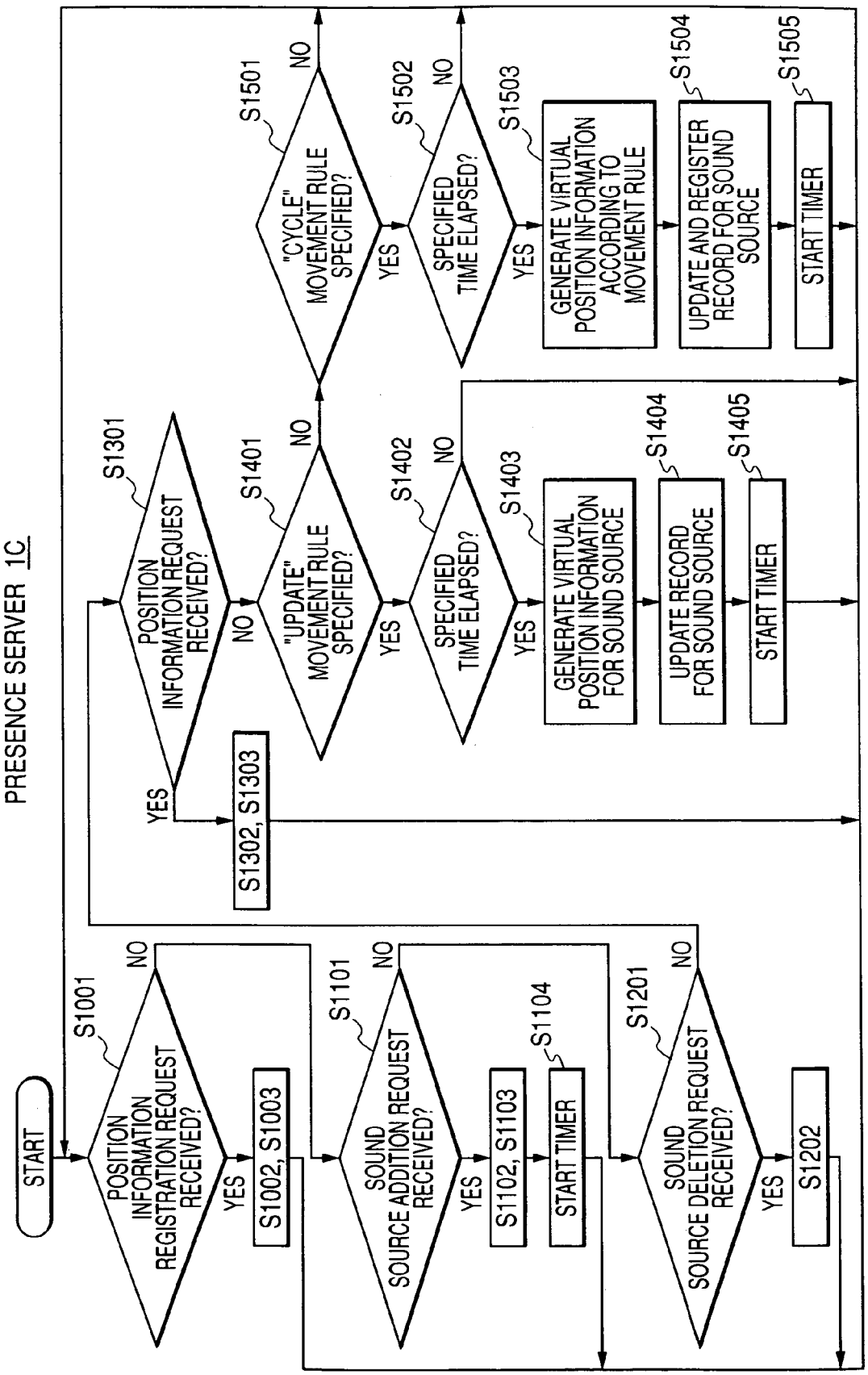
FIG. 21 shows an operational flow of a presence server 1C.

FIG. 21 shows an operational flow of the presence server 1C.

The following process is the same as that shown in FIG. 4 according to the first embodiment. The position information management unit 102C performs the process at S1002 and S1003 when receiving a position information registration request from the voice telecommunication terminal 4 via the IP network interface unit 101 (YES at S1001). The position information management unit 102C performs the process at S1202 when receiving a sound source deletion request from the advertisement server 3C from the IP network interface unit 101 (YES at S1201). The position information management unit 102C performs the process at S1302 and S1303 when receiving a position information request from the media server 2 or the voice telecommunication terminal 4 via the IP network interface unit 101 (YES at S1301).

The position information management unit 102C performs the process at S1102 and S1103 in FIG. 4 according to the first embodiment when receiving a sound source addition request from the advertisement server 3C via the IP network interface unit 101 (YES at S1101). In addition, the position information management unit 102C starts a built-in timer, though not shown (S1104).

Further, the presence server 1C according to the embodiment performs the following process. That is, the position information management unit 102C checks whether or not the position information storage unit 103C registers the record 1030C (whose field 1035 contains the movement rule other than null data) for the advertisement sound source. When that record 1030C is registered, the position information management unit 102C checks whether or not the field 1035 of the record 1030C registers the "Update" movement rule (S1401). When the movement rule is "Update" (YES at S1401), the position information management unit 102C further checks whether or not the built-in timer indicates the elapse of specified time (S1402). When the built-in timer indicates the elapse of specified time (YES at S1402), the position information management unit 102C regenerates the virtual position information for the advertisement sound source similarly to S1102 in FIG. 4 (S1403). The position information management unit 102C updates the virtual position information registered in the field 1033 of the record 1030C for the advertisement sound source to the regenerated virtual position information (S1404). The position information management unit 102C resets the built-in timer (S1405) and returns to S1001. When the built-in timer does not indicate the elapse of specified time (NO at S1402), the position information management unit 102C immediately returns to S1001.

There may be a case where the position information storage unit 103C registers the record 10301C for the advertisement sound source and the field 1035 of the record 1030C does not register the "Update" movement rule (NO at S1401). In such case, the position information management unit 102C checks whether or not the field 1035 registers the "Cycle" movement rule (S1501). When the movement rule is "Cycle" (YES at S1501), the position information management unit 102C checks whether or not the built-in timer indicates the elapse of specified time (S1502). When the built-in timer indicates the elapse of specified time (YES at S1502), the position information management unit 102C follows the movement rule registered in the field 1035 of the record 1030C for the advertisement sound source. The position information management unit 102C specifies the next virtual position according to the order of virtual positions contained in the virtual position information registered in the field 1033. The position information management unit 102C determines the orientation of the advertisement sound source at the virtual position similarly to S1102 in FIG. 4. The position information management unit 102C regenerates the virtual position information containing the specified virtual position and the determined orientation (S1503). The position information management unit 102C updates the virtual position information registered in the field 1033 of-the record 1030C for the advertisement sound source to the regenerated virtual position information (S1504). The position information management unit 102C then resets the built-in timer (S1505) and returns to S1001. When the built-in timer does not indicate the elapse of specified time (NO at S1502), the position information management unit 102C immediately returns to S1001.

The fourth embodiment of the invention has been described.

The fourth embodiment provides the following effect in addition to the effect of the first embodiment. That is, the advertisement sound source automatically moves in the virtual space and enables more users in the virtual space to hear acoustic data for the advertisement sound source. The advertising effectiveness can be improved.

Fifth Embodiment

The fifth embodiment allows a user of a voice telecommunication terminal 4D to request acoustic data for the advertisement sound source provided by an advertisement server 3D in the first embodiment.

The voice telecommunication system according to the fifth embodiment differs from the voice telecommunication system according to the first embodiment in that the advertisement server 3 and the voice telecommunication terminal 4 are replaced by the advertisement server 3D and the voice telecommunication terminal 4D. The other parts of the construction are the same as those of the first embodiment.

Figure 22:
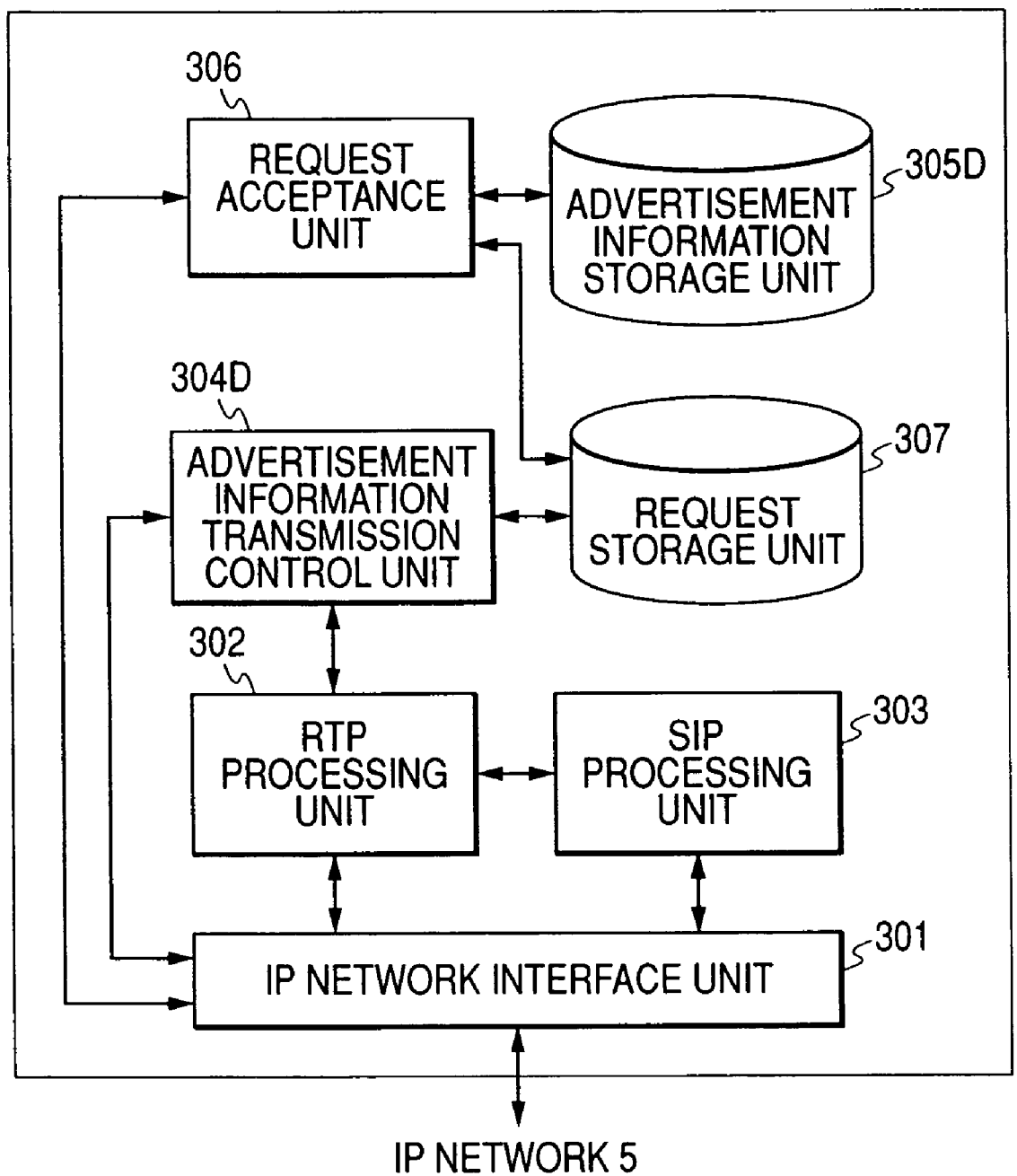
FIG. 22 is a schematic construction diagram an advertisement server 3D.

FIG. 22 is a schematic construction diagram the advertisement server 3D.

As shown in FIG. 22, the advertisement server 3D differs from the advertisement server 3 according to the first embodiment in that the advertisement information transmission control unit 30 and the advertisement information storage unit 305 are replaced by an advertisement information transmission control unit 304D and an advertisement information storage unit 305D and a request acceptance unit 306 and a request storage unit 307 are provided. The other parts of the construction are the same as those of the advertisement server 3.

The advertisement information storage unit 305D stores not only acoustic data for the advertisement sound source, but also advertisement guide information. FIG. 23 schematically shows a registration content of the advertisement information storage unit 305D. As shown in FIG. 23, a record 3050D is registered for each acoustic data of the advertisement sound source. The record 3050D differs from the record 3050 (see FIG. 10) according to the first embodiment in that the record 3050D is provided with a field 3056 for registering the advertisement guide information instead of the field 3053 for registering the transmission time slot for acoustic data of the advertisement sound source.

The request storage unit 307 registers a request for acoustic data of the advertisement sound source when the request is accepted from the voice telecommunication terminal 4. FIG. 24 schematically shows a registration content of the request storage unit 307. As shown in FIG. 24, a record 3070 is registered for each request accepted from the voice telecommunication terminal 4. The record 3070 contains fields 3071, 3072, and 3073. The field 3071 registers the date and time the request was accepted. The field 3072 registers the user/sound-source ID for the voice telecommunication terminal as the request transmission origin. The field 3073 registers the user/sound-source ID for acoustic data of the requested advertisement sound source.

The request acceptance unit 306 follows a list request accepted by the voice telecommunication terminal 4 via the IP network interface unit 301. The request acceptance unit 306 generates an advertisement list that contains the user/sound-source ID and the guide information registered in the fields 3051 and 3056 in each record 3050D registered in the advertisement information storage unit 305D. The request acceptance unit 306 transmits the advertisement list to the voice telecommunication terminal 4 as the list request transmission origin. When accepting the request from the voice telecommunication terminal 4 via the IP network interface unit 301, the request acceptance unit 306 adds a new record 3070 to the request storage unit 307. The request acceptance unit 306 registers the current date and time in the field 3071 of the added record 3070. The request acceptance unit 306 registers, in the field 3072, the user/sound-source ID for the request transmission origin contained in the request. The request acceptance unit 306 registers, in the field 3073, the user/sound-source ID of acoustic data for the advertisement sound source as a request target contained in the request.

The advertisement information storage unit 305D stores acoustic data for the advertisement sound source. A request stored in the request storage unit 305 specifies the acoustic data. The advertisement information transmission control unit 304D controls transmission of the acoustic data to the media server 2. FIG. 25 shows an operational flow of the advertisement information position control unit 304D.

The advertisement information transmission control unit 304D searches the request storage unit 307 for the record 3070 that registers the earliest reception date and time in the field 3071. The advertisement information transmission control unit 304D assumes this record to be a focused record (S3101). The advertisement information transmission control unit 304D then generates a sound source addition request containing the user/sound-source ID registered in the field 3073 of the focused record. The advertisement information transmission control unit 304D transmits the generated sound source addition request to the presence server 1 via the IP network interface unit 301 (S3102).

The advertisement information transmission control unit 304D allows the SIP control unit 303 to establish a speech path (S3103). In response to this, the SIP control unit 303 performs an SIP-compliant call control procedure to establish a speech path to the media server 2.

The advertisement information transmission control unit 304D searches the advertisement information storage unit 305D for the record 3050D whose field 3051 registers the user/sound-source ID registered in the field 3073 of the focused record. The advertisement information transmission control unit 304D output the acoustic data registered in the field 3052 of the retrieved record 3050D to the RTP processing unit 302 (S3104). In response to this, the RTP processing unit 302 uses the speech path to the media server 2 to transmit the acoustic data received from the advertisement information transmission control unit 304b to the media server 2. Thereafter, the advertisement information transmission control unit 304D periodically repeats output of the acoustic data to the RTP processing unit 302. As a result, the acoustic data is repeatedly transmitted to the media server 2.

The advertisement information transmission control unit 304D uses the built-in timer and the like to detect that the specified time has elapsed from the time to start the process at S3104, i.e., repeatedly reproducing the acoustic data, (YES at S3105). In this case, the advertisement information transmission control unit 304D stops transmitting the acoustic data to the media server 2 using the speech path (S3106). The advertisement information transmission control unit 304D then allows the SIP control unit 303 to disconnect the speech path (S3107). In response to this, the SIP control unit 303 disconnects the speech path to the media server 2 in accordance with the SIP.

The advertisement information transmission control unit 304D generates a sound source deletion request containing the user/sound-source ID of the own advertisement server 3. The advertisement information transmission control unit 304D transmits the generated sound source deletion request to the presence server 1 (S3108). Thereafter, the advertisement information transmission control unit 304D deletes the focused record from the request storage unit 307 (S3109) and then returns to S3101.

FIG. 26 is a schematic construction diagram of the voice telecommunication terminal 4D.

As shown in FIG. 26, the voice telecommunication terminal 4D according to the embodiment differs from the voice telecommunication terminal 4 according to the first embodiment in that a request acceptance unit 412 is newly provided. The other parts of the construction are the same as those of the voice telecommunication terminal 4.

According to a list browse instruction accepted from the user via the operation acceptance unit 404, the request acceptance unit 412 generates a list request containing the user/sound-source ID for the own voice telecommunication terminal 4D. The request acceptance unit 412 transmits the generated list request to the advertisement server 3D via the IP network interface unit 407. The request acceptance unit 412 follows the advertisement list received from the advertisement server 3D via the IP network interface unit 407 to generate video data for a request acceptance screen 4120 as shown in FIG. 27 and output the video date from the video output unit 403. The request acceptance screen 4120 lists sets of a user/sound-source ID 4121 for the acoustic data of the advertisement sound source and guide information 4122. The request acceptance screen 4120 is used to accept a request for the acoustic data of the advertisement sound source from the user. The user may operate the pointing device 424 to select a set of the user/sound-source ID 4121 and the guide information 4122 from the request acceptance screen 4120. In this case, the request acceptance unit 412 accepts the set of the user/sound-source ID 4121 and the guide information 4122, generates a request containing the set, and transmits the request to the advertisement server 3D via the IP network interface unit 407.

The fifth embodiment of the invention has been described.

The fifth embodiment provides the following effect in addition to the effect of the first embodiment. That is, it is possible to allow any user to hear acoustic data of the advertisement sound source according to his or her request. The advertising effectiveness can be improved.

It is to be distinctly understood that the invention is not limited to the above-mentioned embodiments but may be otherwise variously embodied within the spirit and scope of the invention.

There have been described the embodiments where the media server 2 or 2B performs the 3D audio process and the synthesis process for acoustic data of the advertisement sound source and voice data for each user. However, the invention is not limited thereto. The voice telecommunication terminal 4 or 4D may perform the 3D audio process and the synthesis process for acoustic data of the advertisement sound source and voice data for each user. In this case, the voice telecommunication terminal 4 or 4D establishes speech paths to the voice telecommunication terminals 4 and 4D other than the own terminal, and to the advertisement servers 3, 3A, and 3D. The voice telecommunication terminal 4 or 4D transmits the own terminal user's voice data to the voice telecommunication terminals 4 and 4D other than the own terminal. In addition, the voice telecommunication terminal 4 or 4D receives the voice data and the acoustic data from the voice telecommunication terminals 4 and 4D other than the own terminal and from the advertisement servers 3, 3A, 3C, and 3D. The voice telecommunication terminal 4 or 4D performs the 3D audio process for the received voice data and acoustic data and synthesizes these pieces of data based on: virtual position information, received from the presence servers 1, 1A, 1B, and 1C, about the voice telecommunication terminals 4 and 4D other than the own terminal and about the advertisement servers 3, 3A, 3C, and 3D; and virtual position information about the own terminal. In this manner, the media servers 2 and 2B are unnecessary.

According to the above-mentioned embodiments, the presence server 1 determines a virtual position of the advertisement sound source in the virtual space so that the distance between the advertisement sound source and a user of the voice telecommunication terminal 4 is longer than at least the distance between the user of the relevant voice telecommunication terminal 4 and another user of the nearest voice telecommunication terminal 4. However, the invention is not limited thereto. The user of the voice telecommunication terminal only needs to be able to distinguish the virtual position of the advertisement sound source in the virtual space from a virtual position of a user of another voice telecommunication terminal 4. For example, it may be preferable to determine the virtual position of the advertisement sound source in the virtual space so that a specified angle is formed between the orientation of the advertisement sound source (sound output direction) viewed from the user of the voice telecommunication terminal 4 and at least the orientation of another user of the nearest voice telecommunication terminal 4 viewed from the user of the voice telecommunication terminal 4.

Figure 28A:
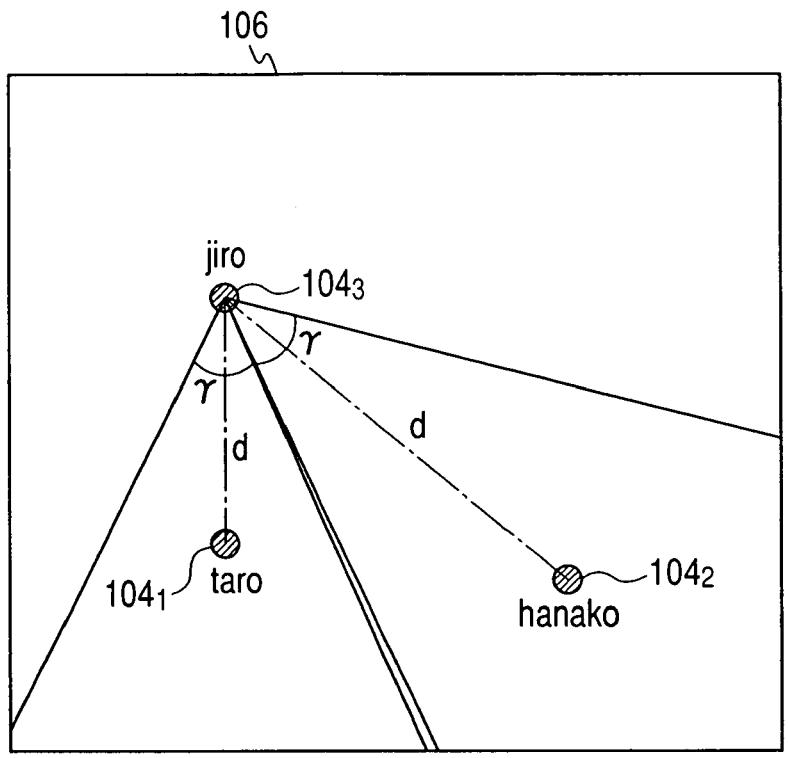
FIG. 28 shows a position of an advertisement sound source in a virtual space.
Figure 28B:
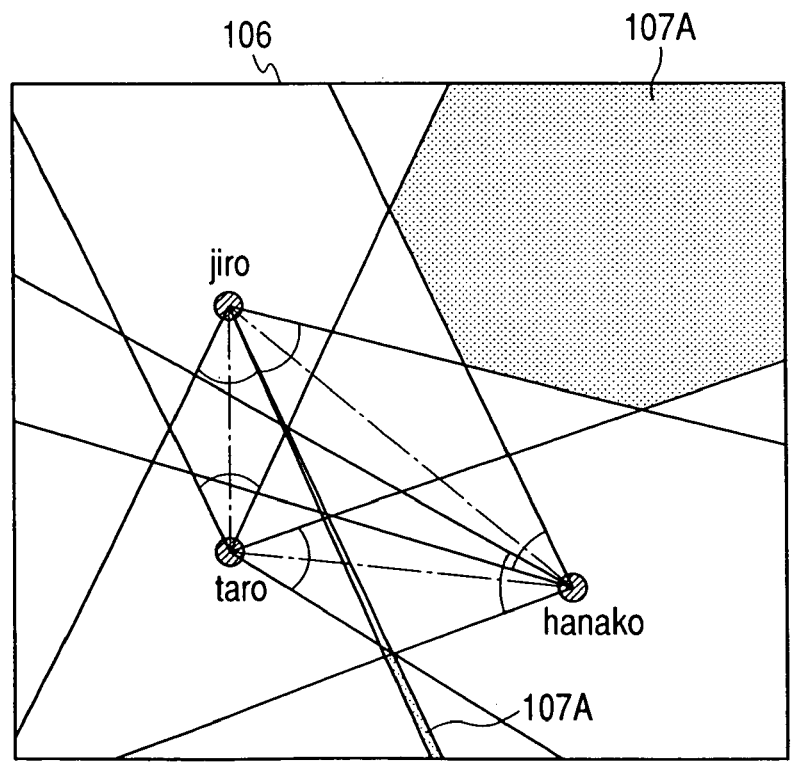

Specifically, the position information management unit 102 of the presence server 1 performs the following process. As shown in FIG. 28A, a given voice telecommunication terminal 4 is selected. The user of this voice telecommunication terminal 4 is assumed to view a user of another voice telecommunication terminal 4 from that user's virtual position along direction d. The position information management unit 102 estimates angular range γ along direction d as center from the viewing user. The position information management unit 102 finds an area not belonging to the angular range γ for each of the other voice telecommunication terminals 4. As shown in FIG. 28B, the position information management unit 102 performs this process for all the voice telecommunication terminals 4 and finds a region 107A where all the resulting areas overlap. When multiple regions 107A are available, the position information management unit 102 selects any one of them. When no region 107A is available, the position information management unit 102 decreases the angular range γ. Alternatively, the position information management unit 102 recalculates the region 107A by excluding a user of another voice telecommunication terminal 4 farthest from the virtual position for the user of the relevant voice telecommunication terminal 4 for each of the voice telecommunication terminals 4. The position information management unit 102 determines the orientation of the advertisement sound source in the virtual space similarly to the above-mentioned embodiments (see FIG. 5B).

Figure 29A:
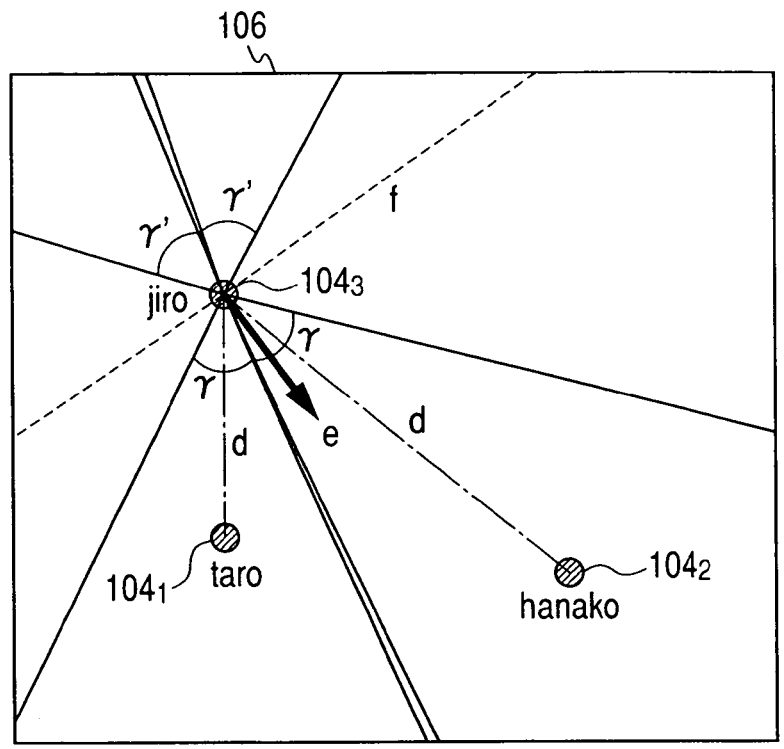
FIG. 29 shows a position of an advertisement sound source in a virtual space.
Figure 29B:
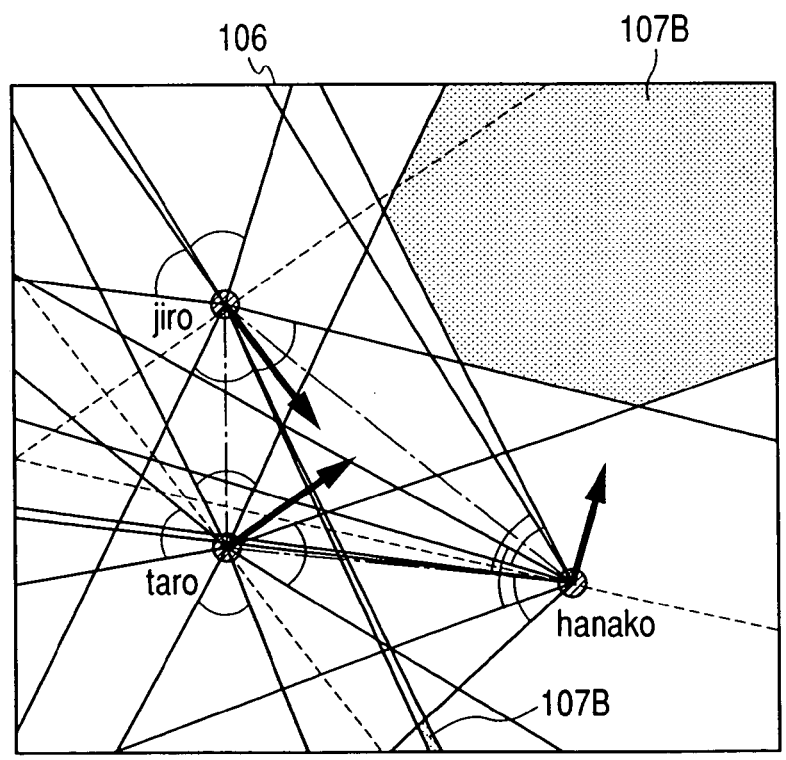

The human hearing has a weakness of difficulty in identifying sound sources positioned symmetrically about a line connecting both ears. That is, it is difficult to distinguish sound sources symmetrically positioned forward and backward, top and bottom, and the like with respect to that line. The sound sources can be arranged by avoiding these positions as follows. As shown in FIG. 28A, a given voice telecommunication terminal 4 is selected. The user of this voice telecommunication terminal 4 is assumed to view a user of another voice telecommunication terminal 4 from that user's virtual position along direction d. The position information management unit 102 estimates specified angular range γ along direction d as center from the viewing user. In addition, line f (a line connecting both ears of the user) is assumed to be orthogonal to orientation e of the user of the voice telecommunication terminal 4. The specified angular range γ and range γ' are assumed to be symmetrical with respect to the line f. The position information management unit 102 finds an area not belonging to γ nor to γ' for each of the other voice telecommunication terminals. As shown in FIG. 29B, the position information management unit 102 performs this process for all the voice telecommunication terminals 4 and finds a region 107B where all the resulting areas overlap.

The above-mentioned embodiments have been described using SIP to establish speech paths. However, the invention is not limited thereto. For example, it may be preferable to use call the other control protocols such as H.323 than SIP.

The above-mentioned embodiments have been described so as to provide users of the voice telecommunication terminals 4 with contents such as acoustic data of the advertisement sound source. However, the invention is not limited thereto. For example, the invention can be used for a case of providing users with the other acoustic data including musical compositions as contents.

While the above-mentioned embodiments have been described using the audio advertisement as an example, the invention is not limited thereto. There may be a case of using a terminal that displays 3D graphics for the user and the advertisement sound source positioned in the virtual space instead of or in addition to output voice from the user and the advertisement sound source positioned in the virtual space. When the advertisement uses image or image and voice, the invention can determine the arrangement of the advertisement and display the advertisement using 3D graphics. In this case, however, placing the advertisement backward of the user provides little effect. It is necessary to determine the arrangement of the advertisement so that as many users as possible can view the advertisement. When taking a user preference into consideration, the advertisement needs to be positioned so that a highly-prioritized user can view the advertisement.

What is claimed is:

1. A voice call system that includes a plurality of voice telecommunication terminals, a content server to provide a sound source for each of the plurality of voice telecommunication terminals, and a presence server to manage positions of users of the plurality of voice telecommunication terminals and a sound source provided by the content server in a virtual space, the voice call system comprising:

a presence acquisition unit that acquires information about positions of users of the plurality of voice telecommunication terminals and the sound source provided by the content server in a virtual space from the presence server; and an audio renderer provided for each of the voice telecommunication terminals, wherein the audio renderer performs a process for applying a stereophonic process to voice data for each of voice telecommunication terminals other than a voice telecommunication terminal corresponding to the audio renderer in accordance with a relative position between each of users of the other voice telecommunication terminals and a user of the voice telecommunication terminal corresponding to the audio renderer, in which the presence acquisition unit acquires position information to specify the relative position and a stereophonic process to acoustic data from a sound source provided by the content server in accordance with a relative position between the sound source and the user of the voice telecommunication terminal, in which the presence acquisition unit acquires position information to specify the relative position; and a process for synthesizing the stereophonically processed voice data for each of the other voice telecommunication terminals with acoustic data for the sound source to generate voice call data for the voice telecommunication terminal corresponding to the audio renderer; and wherein the presence server includes:

a position information management unit that determines a position of the sound source in a virtual space in terms of each of the plurality of voice telecommunication terminals so that a user of a relevant voice telecommunication terminal can distinguish the position of the sound source in the virtual space from positions of users of the other voice telecommunication terminals.

2. The voice call system according to claim 1, wherein the position information management unit determines a position of the sound source in a virtual space for each of the plurality of voice telecommunication terminals based on a preference of a user of the predetermined voice telecommunication terminal so that the user of the voice telecommunication terminal can distinguish the position of the sound source in the virtual space from a user of another voice telecommunication terminal.

3. The voice call system according to claim 1, wherein the audio renderer performs a process, when a policy of "sound source provided" is specified for a voice telecommunication terminal corresponding to the audio renderer, for applying

- a stereophonic process to voice data for each of voice telecommunication terminals other than a voice telecommunication terminal corresponding to the audio renderer in accordance with a relative position between each of users of the other voice telecommunication terminals and a user of the voice telecommunication terminal corresponding to the audio renderer, in which the presence acquisition unit acquires position information to specify the relative position and
- a stereophonic process to acoustic data from a sound source provided by the content server in accordance with a relative position between the sound source and the user of the voice telecommunication terminal, in which the presence acquisition unit acquires position information to specify the relative position; and
- a process for synthesizing the stereophonically processed voice data for each of the other voice telecommunication terminals with acoustic data for the sound source to generate voice call data for the voice telecommunication terminal corresponding to the audio renderer; and
- a process, when a policy of "no sound source provided" is specified for a voice telecommunication terminal corresponding to the audio renderer, for applying
- a stereophonic process to voice data for each of voice telecommunication terminals other than a voice telecommunication terminal corresponding to the audio renderer in accordance with a relative position between each of users of the other voice telecommunication terminals and a user of the voice telecommunication terminal corresponding to the audio renderer, in which the presence acquisition unit acquires position information to specify the relative position and
- a process for synthesizing the stereophonically processed voice data for each of the other voice telecommunication terminals to generate voice call data for the voice telecommunication terminal corresponding to the audio renderer.

4. The voice call system according to claim 1, wherein the position information management unit periodically performs the determination to update a position of the sound source in a virtual space.

5. The voice call system according to claim 1, wherein the content server includes a request acceptance unit for accepting a request from the voice telecommunication terminal and configures the requested sound source to be provided for each of the plurality of voice telecommunication terminals.

6. The voice call system according to claim 1, further comprising: a media server including the presence acquisition unit and an audio renderer provided for each of the voice telecommunication terminals.

7. The voice call system according to claim 1, wherein each of the plurality of voice telecommunication terminal includes the presence acquisition unit and an audio renderer corresponding to own terminal.

8. A method of providing contents during a voice call, namely, providing acoustic data of a sound source for each of a plurality of voice telecommunication terminal during a voice call in a voice call system that includes the plurality of voice telecommunication terminals, a content server to provide the sound source for each of the plurality of voice telecommunication terminals, and a presence server to manage positions of users of the plurality of voice telecommunication terminals and a sound source provided by the content server in a virtual space, the method comprising:

- determining a position of the sound source in a virtual space in terms of each of the plurality of voice telecommunication terminals so that a user of a relevant voice telecommunication terminal can distinguish the position of the sound source in the virtual space from positions of users of the other voice telecommunication terminals;
- applying a stereophonic process to voice data for each of voice telecommunication terminals other than a relevant voice telecommunication terminal in accordance with a relative position between each of users of the other voice telecommunication terminals and a user of the relevant voice telecommunication terminal and applying a stereophonic process to acoustic data from the sound source in accordance with a relative position between the sound source and the user of the relevant voice telecommunication terminal; and
- synthesizing the stereophonically processed voice data for each of the other voice telecommunication terminals with acoustic data for the sound source to generate voice call data for the relevant voice telecommunication terminal.

* * * * *